United States Patent
Chandra et al.

(10) Patent No.: US 12,238,109 B2
(45) Date of Patent: Feb. 25, 2025

(54) CLOUD SERVICE-BASED SECURED DATA WORKFLOW INTEGRATION AND METHODS THEREOF

(71) Applicant: Capital One Services, LLC, McLean, VA (US)

(72) Inventors: Niharendu Chandra, Glen Allen, VA (US); Luke Adams, Doswell, VA (US)

(73) Assignee: Capital One Services, LLC, McLean, VA (US)

( * ) Notice: Subject to any disclaimer, the term of this patent is extended or adjusted under 35 U.S.C. 154(b) by 372 days.

(21) Appl. No.: 17/731,007

(22) Filed: Apr. 27, 2022

(65) Prior Publication Data

US 2023/0353575 A1    Nov. 2, 2023

(51) Int. Cl.
*H04L 9/40*    (2022.01)
*G06Q 20/20*   (2012.01)

(52) U.S. Cl.
CPC ......... *H04L 63/102* (2013.01); *G06Q 20/206* (2013.01); *H04L 63/08* (2013.01)

(58) Field of Classification Search
CPC ...... H04L 63/102; H04L 63/08; G06Q 20/206
See application file for complete search history.

(56) References Cited

U.S. PATENT DOCUMENTS 9,324,088 B2    4/2016  Yoder et al.
10,430,772 B1 *  10/2019  Redmond ............ G06Q 20/382
11,146,569 B1 *  10/2021  Brooker ................. G06F 21/335
11,501,292 B1 *  11/2022  Pearce ................ G06Q 20/4014
2010/0106796 A1 *  4/2010  Van Gassel ........... H04L 51/212
                                                          709/207

(Continued)

FOREIGN PATENT DOCUMENTS

WO    WO-2016049636 A2 *  3/2016  ........... G06F 21/335

OTHER PUBLICATIONS

Torkashvan, M., & Haghighi, H. (2016). SCW+: A service-oriented framework for cloud workflow systems. Scientia Iranica. Transaction D, Computer Science & Engineering, Electrical, 23(3), 1195-1216. Retrieved from https://www.proquest.com/scholarly-journals/scw-service-oriented-framework-cloud-workflow (Year: 2016).*

(Continued)

*Primary Examiner* — Ashford S Hayles
(74) *Attorney, Agent, or Firm* — Greenberg Traurig, LLP

(57) ABSTRACT

The present disclosure includes systems and methods enabling secure workflows by receiving an electronic event authentication message from an initiator device, where the electronic event authentication message comprises a user profile identifier, and an entity identifier. A first device-specific actions-sequence token is generated for an actions-sequence session to execute a device-specific instance of at least one automated processing actions-sequence. A workflow request message is received from the initiator device that includes the user profile identifier and the entity identifier, and a second device-specific actions-sequence token is generated. Where the first and second device-specific actions-sequence tokens match, the actions-sequence session is executed and a criterion update in response to the actions-sequence session is produced. The criterion update may then be transmitted to the initiator device.

20 Claims, 8 Drawing Sheets

(56) References Cited

U.S. PATENT DOCUMENTS

| | | | | |
|---|---|---|---|---|
| 2011/0296440 | A1* | 12/2011 | Laurich | H04L 67/1097 |
| | | | | 719/326 |
| 2012/0290478 | A1* | 11/2012 | Crofts | G06Q 20/322 |
| | | | | 705/44 |
| 2013/0013804 | A1* | 1/2013 | Traynor | H04L 12/1859 |
| | | | | 709/232 |
| 2013/0179348 | A1* | 7/2013 | Crofts | G06Q 20/322 |
| | | | | 705/44 |
| 2013/0282589 | A1* | 10/2013 | Shoup | G06F 21/34 |
| | | | | 726/5 |
| 2014/0006261 | A1* | 1/2014 | Hogg | G06Q 20/22 |
| | | | | 705/39 |
| 2014/0006283 | A1* | 1/2014 | Hogg | G06Q 20/384 |
| | | | | 705/44 |
| 2014/0198909 | A1* | 7/2014 | Allen | G06Q 30/00 |
| | | | | 379/265.09 |
| 2014/0297386 | A1* | 10/2014 | Allen | H04L 67/56 |
| | | | | 705/14.27 |
| 2015/0058931 | A1* | 2/2015 | Miu | G06Q 20/02 |
| | | | | 707/784 |
| 2015/0355889 | A1* | 12/2015 | Kilby | G06F 16/51 |
| | | | | 705/333 |
| 2016/0371622 | A1* | 12/2016 | Kurian | G06Q 10/06316 |
| 2017/0302641 | A1* | 10/2017 | Ramatchandirane | |
| | | | | G06Q 20/4012 |
| 2017/0346851 | A1* | 11/2017 | Drake | H04L 9/0838 |
| 2018/0005203 | A1 | 1/2018 | Grassadonia et al. | |
| 2018/0084073 | A1* | 3/2018 | Walsh | H04L 67/12 |
| 2019/0068630 | A1* | 2/2019 | Valecha | H04L 63/1408 |
| 2019/0384632 | A1* | 12/2019 | Parikh | G06F 21/554 |
| 2019/0386969 | A1* | 12/2019 | Verzun | G06F 21/606 |
| 2020/0174887 | A1* | 6/2020 | Wilding | G06F 11/3664 |
| 2020/0314087 | A1* | 10/2020 | Zeck | G06F 3/0482 |
| 2020/0351090 | A1* | 11/2020 | Gardner | H04L 9/3247 |
| 2021/0165862 | A1* | 6/2021 | Agrawal | G06F 16/2379 |
| 2021/0360016 | A1* | 11/2021 | Kaushal | H04L 41/069 |
| 2021/0373942 | A1* | 12/2021 | Lv | H04L 63/0815 |
| 2021/0377272 | A1* | 12/2021 | Dasari | H04L 63/20 |
| 2022/0005039 | A1* | 1/2022 | Hires | G06Q 20/4014 |
| 2022/0058287 | A1* | 2/2022 | Hirson | G06F 21/316 |
| 2022/0103541 | A1* | 3/2022 | Sethi | H04L 63/0815 |
| 2022/0198394 | A1* | 6/2022 | Chandra | H04L 63/0807 |
| 2022/0300917 | A1* | 9/2022 | Wied | G06Q 20/027 |

OTHER PUBLICATIONS

Dhar, M. S. M., & Manimegalai, R. (2018). A policy-oriented secured service for the e-commerce applications in cloud. Personal and Ubiquitous Computing, 22(5-6), 911-919. doi:https://doi.org/10.1007/s00779-018-1138-1 (Year: 2018).*

S. Nepal et al., "TruXy: Trusted Storage Cloud for Scientific Workflows," in IEEE Transactions on Cloud Computing, vol. 5, No. 3, pp. 428-442, Jul. 1-Sep. 2017, doi: 10.1109/TCC.2015.2489638. (Year: 2017).*

* cited by examiner

CLOUD SERVICE-BASED SECURED DATA WORKFLOW INTEGRATION AND METHODS THEREOF

TECHNICAL FIELD

The present disclosure generally relates to computer-based methods and systems for cloud service-based secured data workflow integration, including entity-agnostic user communication services with improved user data security.

BACKGROUND

Electronic accounts can sometimes be used by a user to engage in an electronic activity with a third-party. Often, the third-party may need user data to effectuate processes related to the electronic activity, such as sending a communication to the user regarding the electronic activity. Typically, the user would then provide personal contact information or other sensitive user data to the third-party, so the processes may be performed.

SUMMARY

In some aspects, the techniques described herein relate to a method including: receiving, by the at least one processor, a workflow request message from the initiator device, wherein the workflow request message is associated with a workflow request; wherein the workflow request message includes: at least one user profile identifier identifying the user profile associated with the user, at least one entity identifier identifying the entity and a actions-sequence identifier identifying the at least one automated processing actions-sequence, including a plurality of instructions corresponding to a plurality of actions; determining, by the at least one processor, the at least one automated processing actions-sequence based at least in part on: the actions-sequence identifier and at least one registered actions-sequence; generating, by the at least one processor, a first device-specific actions-sequence token for the actions-sequence session; wherein the first device-specific actions-sequence token is based on the workflow request message; generating, by the at least one processor, a workflow authorization request including the second device-specific actions-sequence token; receiving, by the at least one processor, a workflow execution authorization in response to the workflow authorization request; wherein the workflow execution authorization includes: a verification that the first device-specific actions-sequence token matches a second device-specific actions-sequence token, and user data of the user; wherein the second device-specific actions-sequence token is based on an electronic event authentication message from an initiator device associated with an entity; wherein the electronic event authentication message includes: the at least one user profile identifier identifying the user profile associated with the user, and the at least one entity identifier identifying the entity; executing, by the at least one processor, within the actions-sequence session, the instance of the at least one automated processing actions-sequence based at least in part on: the workflow execution authorization; the actions-sequence identifier, and user data of the user; wherein the user data of the user confidentially stored separate from the entity; generating, by the at least one processor, at least one criterion update in response to the executing the instance of the automated processing actions-sequence; and transmitting, by the at least one processor, a criterion notification to the initiator device, a computing device associated with the user, or both; wherein the criterion notification includes an indication of the at least one criterion update.

In some aspects, the techniques described herein relate to a method, further including electronically communicating, by the at least one processor, the criterion notification to contact information identified in the user data, wherein the contact information identifies a communication address of the computing device.

In some aspects, the techniques described herein relate to a method, wherein the contact information includes a telephone number specified in a user account at a financial institution and the criterion notification includes a text message to the telephone number.

In some aspects, the techniques described herein relate to a method, wherein the first device-specific actions-sequence token is a one-time token that expires upon generating the at least one criterion update.

In some aspects, the techniques described herein relate to a method, further including receiving, by the at least one processor, the electronic event authentication message via a payment advice and authorization message standard.

In some aspects, the techniques described herein relate to a method, further including receiving, by the at least one processor, the workflow request message via an application programming interface (API) over an Internet.

In some aspects, the techniques described herein relate to a method, wherein the initiator device includes a point-of-sale device.

In some aspects, the techniques described herein relate to a method, wherein the point-of-sale device includes a payment system associated with a merchant.

In some aspects, the techniques described herein relate to a method, further including receiving, by the at least one processor, a transaction fulfillment message as the at least one electronic message from a merchant associated with the initiator device, wherein the transaction fulfillment message indicates a fulfillment of a condition of a transaction associated with the workflow request message.

In some aspects, the techniques described herein relate to a method, wherein the criterion notification includes a purchased item shipping confirmation.

In some aspects, the techniques described herein relate to a system including: at least one processor configured to execute software instruction causing the at least one processor to perform steps to: receive a workflow request message from the initiator device, wherein the workflow request message is associated with a workflow request; wherein the workflow request message includes: at least one user profile identifier identifying the user profile associated with the user, at least one entity identifier identifying the entity and a actions-sequence identifier identifying the at least one automated processing actions-sequence, including a plurality of instructions corresponding to a plurality of actions; determine the at least one automated processing actions-sequence based at least in part on: the actions-sequence identifier and at least one registered actions-sequence; generate a first device-specific actions-sequence token for the actions-sequence session; wherein the first device-specific actions-sequence token is based on the workflow request message; generate at least one workflow authorization request including the first device-specific actions-sequence token; receive a workflow execution authorization in response to the workflow authorization request; wherein the workflow execution authorization includes: a verification that the first device-specific actions-sequence token matches a second device-specific actions-sequence token, and user data of the user; wherein the second device-specific actions-sequence token is based on an electronic event authentication message from an initiator device associated with an entity; wherein the electronic event authentication message includes: the at least one user profile identifier identifying the user profile associated with the user, and the at least one entity identifier identifying the entity; execute within the actions-sequence session, the instance of the at least one automated processing actions-sequence based at least in part on: the workflow execution authorization; the actions-sequence identifier, and user data of the user; wherein the user data of the user confidentially stored separate from the entity; generate at least one criterion update in response to the executing the instance of the automated processing actions-sequence; and transmit a criterion notification to the initiator device, a computing device associated with the user, or both; wherein the criterion notification includes an indication of the at least one criterion update.

In some aspects, the techniques described herein relate to a system, wherein the software instruction further cause the at least one processor to perform steps to electronically communicate the criterion notification to contact information identified in the user data, wherein the contact information identifies a communication address of the computing device.

In some aspects, the techniques described herein relate to a system, wherein the contact information includes a telephone number specified in a user account at a financial institution and the criterion notification includes a text message to the telephone number.

In some aspects, the techniques described herein relate to a system, wherein the first device-specific actions-sequence token is a one-time token that expires upon generating the at least one criterion update.

In some aspects, the techniques described herein relate to a system, wherein the software instruction further cause the at least one processor to perform steps to receive the electronic event authentication message via a payment advice and authorization message standard.

In some aspects, the techniques described herein relate to a system, wherein the software instruction further cause the at least one processor to perform steps to receive the workflow request message via an application programming interface (API) over an Internet.

In some aspects, the techniques described herein relate to a system, wherein the initiator device includes a point-of-sale device.

In some aspects, the techniques described herein relate to a system, wherein the point-of-sale device includes a payment system associated with a merchant.

In some aspects, the techniques described herein relate to a system, wherein the software instruction further cause the at least one processor to perform steps to receive a transaction fulfillment message as the at least one electronic message from a merchant associated with the initiator device, wherein the transaction fulfillment message indicates a fulfillment of a condition of a transaction associated with the workflow request message.

In some aspects, the techniques described herein relate to a system, wherein the criterion notification includes a purchased item shipping confirmation.

In some aspects, the techniques described herein relate to a method including: receiving, by the at least one processor, a workflow request message from an initiator device; where the workflow request message includes: at least one user profile identifier identifying a user profile of a user associated with the workflow request message, at least one entity identifier identifying an entity associated with the initiator device, and an actions-sequence identifier identifying a workflow including at least one automated processing actions-sequence; generating, by the at least one processor, a first device-specific actions-sequence token based on the workflow request message; receiving, by the at least one processor from at least one separate computer platform, a second device-specific actions-sequence token associated with electronic event authentication message; executing, by the at least one processor, an instance of the at least one automated processing actions-sequence based at least in part on: the first device-specific actions-sequence token matching the second device-specific actions-sequence token, the actions-sequence identifier, and user data of the user; generating, by the at least one processor, at least one message in response to the executing the instance of the automated processing actions-sequence; and transmitting, by the at least one processor, the at least one message to the initiator device, a computing device associated with the user, or both.

BRIEF DESCRIPTION OF THE DRAWINGS

Various embodiments of the present disclosure can be further explained with reference to the attached drawings, wherein like structures are referred to by like numerals throughout the several views. The drawings shown are not necessarily to scale, with emphasis instead generally being placed upon illustrating the principles of the present disclosure. Therefore, specific structural and functional details disclosed herein are not to be interpreted as limiting, but merely as a representative basis for teaching one skilled in the art to variously employ one or more illustrative embodiments.

DETAILED DESCRIPTION

Figure 1:
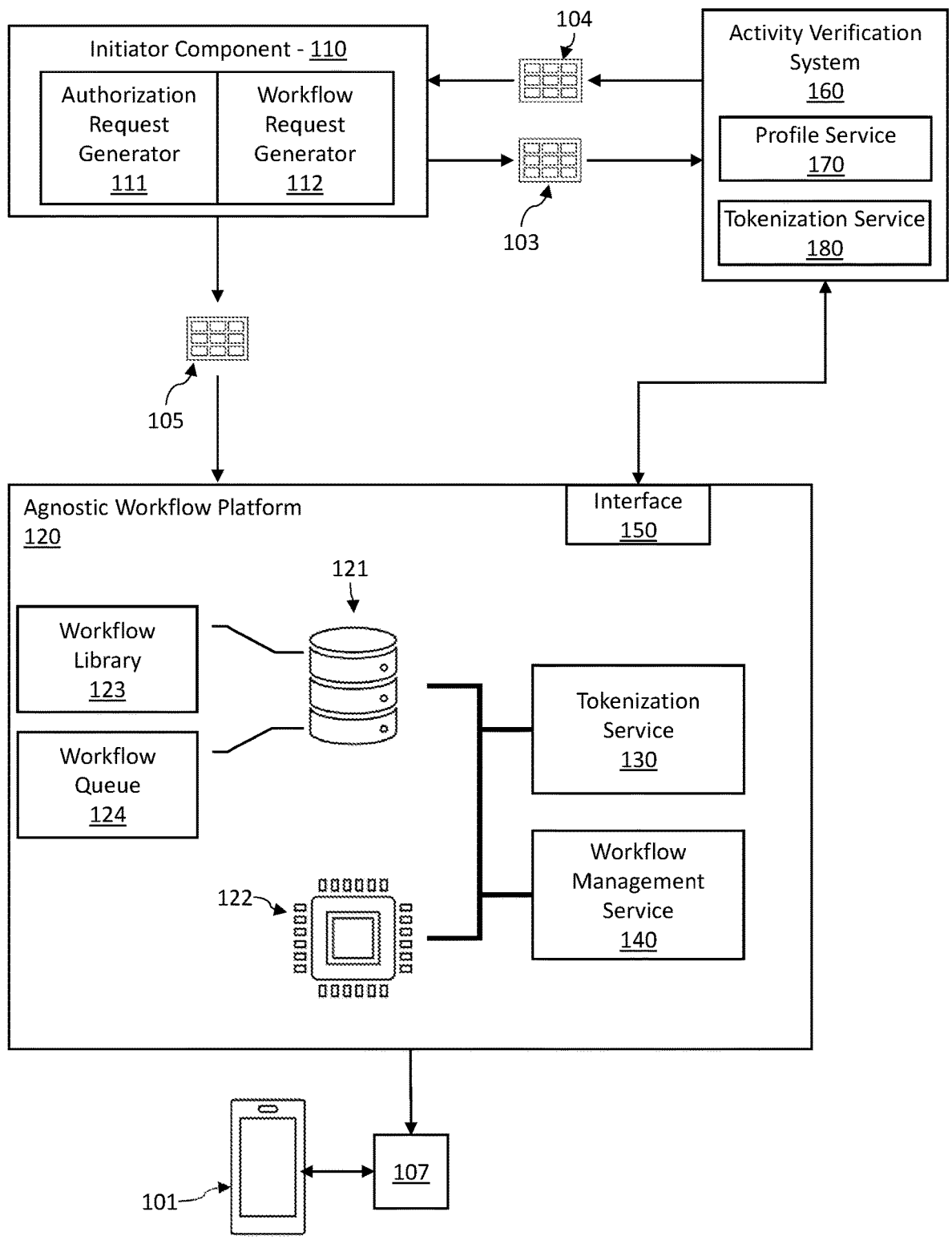
FIG. 1 illustrates a diagram of an exemplary computer-based system for an agnostic secure workflow service in accordance with one or more embodiments of the present disclosure.

Various detailed embodiments of the present disclosure, taken in conjunction with the accompanying figures, are disclosed herein; however, it is to be understood that the disclosed embodiments are merely illustrative. In addition, each of the examples given in connection with the various embodiments of the present disclosure is intended to be illustrative, and not restrictive.

Throughout the specification, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments may be readily combined, without departing from the scope or spirit of the present disclosure.

In addition, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the terms "and" and "or" may be used interchangeably to refer to a set of items in both the conjunctive and disjunctive in order to encompass the full description of combinations and alternatives of the items. By way of example, a set of items may be listed with the disjunctive "or", or with the conjunction "and." In either case, the set is to be interpreted as meaning each of the items singularly as alternatives, as well as any combination of the listed items.

FIGS. 1 through 7 illustrate systems and methods of computer-based interaction (e.g., communication) with one or more users. The following embodiments provide technical solutions and technical improvements that overcome technical problems, drawbacks and/or deficiencies in the technical fields involving efficiency of electronic interaction, including, without limitation, computer-based communication, and user data privacy and/or security. As explained in more detail, below, technical solutions and technical improvements herein include aspects of improved user authentication and/or activity authentication requests to enable computer-based interaction (e.g., direct contact) with the user without accessing user contact data. The following embodiments provide further technical solutions and technical improvements that overcome technical problems, drawbacks and/or deficiencies in the technical fields involving multi-entity integration into a workflow service by separating the workflow service from entity-specific systems.

There may be scenarios where a user may utilize an electronic account to engage in an electronic activity with a third-party. In some instances, additional workflows based on the electronic activity may be performed, such as a third-party sending the user a communication regarding the electronic activity. For example, a user may typically provide user information, such as contact information in order to receive the communication regarding the electronic activity.

A user sharing contact information with the third-party erodes the user's control of personal information and sensitive data, not to mention requires cumbersome and repetitive processes to provide the data to the third-party. Indeed, each entity that has access to the user's data is another opportunity for that data to be comprised or mishandled. Accordingly, a solution for secure and efficient direct contact to a user is needed. Thus, such workflows may face, for example, technical problems, such as account security, data privacy, and information control. For example, when a user shares contact information or provides access to his or her account, the user's control of personal information and/or sensitive data erodes. As another example of a technical problem, in some workflows, each entity may be given access to the user's data. Such access may present an opportunity for that data to be comprised or mishandled.

Accordingly, disclosed embodiments may provide technological improvements that address these challenges, such as by enabling the entity to have direct interaction (e.g., direct contact) with the user without necessarily relying on (or even having access to) a user's contact information or details of the user's electronic activity. Using these and other advancements discussed in this disclosure, disclosed embodiments may improve the security and/or confidentiality of the user's data, along with other technical advancements that may not be explicitly enumerated.

For example, at least some embodiments described herein may provide various technological improvements to various password services that are employed for one-click logins at websites and internet-based services. Such one-click logins may enable a user to login to their account with the password service and leverage a plug-in with individual websites and services authenticate access via the password service, rather than creating or logging in to an account specific to each individual website and service. At least some embodiments of the present disclosure may leverage the relationship of the password service with each individual website and service to provide additional workflows (e.g., providing notifications to the user, other functionalities requiring user data) without necessarily permitting the individual websites and services with access to the user data required for the workflow.

As another example, disclosed embodiments may include multi-factor authentication for user accounts that may improve security of the user accounts. In some embodiments, an illustrative computer system of the present disclosure may be configured to leverage the relationship with a password service, financial entity (e.g., account) and/or other trusted entity (e.g., account) to provide additional workflows to generate and/or communicate multi-factor authentication tokens to the user, without a need for third-party systems to access to the user contact information.

As another example problem, in user service contexts where a user pays a service provider or merchant using a financial account (e.g., using a credit card, debit card, contactless payment, or other suitable payment technology), the user may wait for fulfillment of her/his order to complete the service. Typically, the user may provide the service provider or merchant with contact information so that the user may be provided with a notification of fulfillment, e.g., via telephone, email, social media, internet messaging or other communication media, thus compromising the privacy and security of the user's data.

To mitigate this example issue, service providers and merchants may typically use a variety of computer-based tools such as queue management system, notification devices, and the like. However, at least some tools may require a user to carry around a device, repeatedly look for their order number on a screen, and/or provide personal contact information. A technological solution to the problem of the user giving access to user data or carrying a notification device may include leveraging the financial institution holding the financial account of the user to enable an electronic payment-based order fulfillment system that allows any user paying via an electronic payment method to receive notifications on their mobile devices without having to register themselves with the service provider or merchant. In particular, in some embodiments, contact with the user can be effectuated using a workflow that does not require the user to provide contact information to the service provider or merchant, such as through a service ("Agnostic Notification") that is agnostic and allows for integration with any suitable bank on fulfillment of an electronic payment request and the associated service. Because the financial intuition has an existing relationship with the user, and has user contact information, the financial institution may utilize specially customized tokens and/or authentication messages to an agnostic workflow platform to trigger the workflow. Thus, the user data is protected from third-parties while enabling direct contact between the service provider or merchant and the user.

Further technical benefits become available to users and operators of these systems and methods. Moreover, various practical applications of the disclosed technology are also described, which provide further practical benefits to users and operators that are also new and useful improvements in the art.

FIG. 1 is a block diagram of an exemplary computer-based system for an agnostic secure workflow service in accordance with one or more embodiments of the present disclosure.

In some embodiments, technical solutions, such as those described above, may be provided by an agnostic workflow platform 120 and activity verification system 160 in communication with an initiator component 110. The initiator component 110 may include an authorization request generator 111 to generate and send an authorization request 103 for an electronic activity to the activity verification system 160, and a workflow request generator 112 to generate and send a workflow request 105 to the agnostic workflow platform. The initiator component 110 may include one or more suitable computing devices and/or computing systems having hardware and/or software components for initiating electronic activities.

In some embodiments, the initiator component 110 may include or be incorporated, partially or entirely into at least one point-of-sale device, personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In some embodiments, the activity verification system 160 may include one or more suitable computing devices and/or computing systems having hardware and/or software components for authorizing electronic activities. Thus, the activity verification system 160 may include hardware and software components including, e.g., the user computing device 101 hardware and software, cloud or server hardware and software, or a combination thereof.

In some embodiments, the activity verification system 160 may include hardware components such as a processor, which may include local or remote processing components.

In some embodiments, the processor may include any type of data processing capacity, such as a hardware logic circuit, for example an application specific integrated circuit (ASIC) and a programmable logic, or such as a computing device, for example, a microcomputer or microcontroller that include a programmable microprocessor. Similarly, the activity verification system 160 may include storage, such as local hard-drive, solid-state drive, flash drive, database or other local storage, or remote storage such as a server, mainframe, database, or cloud provided storage solution. In some embodiments, the storage may maintain data for the activity verification system 160. For example, profiles managed by the profile service 170 may be stored in the storage (e.g., in a profile management database). Other data and software of the activity verification system 160 may be stored for on-demand access in the storage.

The activity verification system 160 may include hardware and/or software components for a profile service 170 to access a user profile associated with the authorization request 103 and generate an authorization for the authorization request 103. The activity verification system 160 may include hardware and/or software components for a tokenization service 180 to generate a workflow token for the electronic activity.

In some embodiments, the agnostic workflow platform 120 may include one or more suitable computing devices and/or computing systems having hardware and/or software components for implementing a workflow for the electronic activity associated with the initiator component 110. The agnostic workflow platform 120 may include one or more centralized and/or distributed processing resources and/or storage resources. The agnostic workflow platform 120 may include a user computing device, a server, a cloud platform, or any suitable combination thereof. In some embodiments, a server may include a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud servers are examples.

In some embodiments, the terms "cloud," "Internet cloud," "cloud computing," "cloud architecture," and similar terms correspond to at least one of the following: (1) a large number of computers connected through a real-time communication network (e.g., Internet); (2) providing the ability to run a program or application on many connected computers (e.g., physical machines, virtual machines (VMs)) at the same time; (3) network-based services, which appear to be provided by real server hardware, and are in fact served up by virtual hardware (e.g., virtual servers), simulated by software running on one or more real machines (e.g., allowing to be moved around and scaled up (or down) on the fly without affecting the end user). The examples are, of course, illustrative, and not restrictive.

The agnostic workflow platform 120 may include a processor 122 and a storage 121. In some embodiments, the processor 122 may include any type of data processing capacity, such as a hardware logic circuit, for example an application specific integrated circuit (ASIC) and a programmable logic, or such as a computing device, for example, a microcomputer or microcontroller that include a programmable microprocessor. In some embodiments, the storage 121 may include, e.g., a suitable memory or storage solutions for maintaining electronic data representing the activity histories for each account. For example, the data storage solution may include database technology such as, e.g., a centralized or distributed database, cloud storage platform, decentralized system, server, or server system, among other storage systems. In some embodiments, the data storage solution may, additionally or alternatively, include one or more data storage devices such as, e.g., a hard drive, solid-state drive, flash drive, or other suitable storage device. In some embodiments, the data storage solution may, additionally or alternatively, include one or more temporary storage devices such as, e.g., a random-access memory, cache, buffer, or other suitable memory device, or any other data storage solution and combinations thereof.

The storage 121 may include a workflow library 123 that catalogs workflows and a workflow queue 124 to maintain an order of the execution of workflows. The agnostic workflow platform 120 may include a tokenization service 130 instantiated with the processor 122 and the storage 121 to facilitate generating a second workflow token for the electronic activity to be validated against the workflow token of the activity verification system 160. The agnostic workflow platform 120 may include a workflow management service 140 instantiated with the processor 122 and the storage 121 to facilitate orchestration and ordering of workflows for execution.

In some embodiments, a user computing device 101 may receive an output 107 of a workflow from the agnostic workflow platform 120. Thus, the user computing device 101 may be provided with software services associated with an electronic activity without providing personal data to the initiator component 110 or to an entity associated therewith. In some embodiments, the user computing device 101 may include or be incorporated, partially or entirely into at least one personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In some embodiments, the terms "service", "computer engine" and "engine," including the profile service 170, the tokenization service 180, the tokenization service 130 and the workflow management service 140, identify at least one software component and/or a combination of at least one software component and at least one hardware component which are designed/programmed/configured to manage/control other software and/or hardware components (such as the libraries, software development kits (SDKs), objects, etc.).

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

In some embodiments, a user's account in an agnostic workflow platform 120 may be leveraged to provide user data-based workflows to third-party entities while maintaining confidentiality of the user's data. The user data-based workflows can be performed contemporaneously with verification of an electronic activity relative to the user's account such that the entity can provide additional activity-related services to the user without accessing the user's data. As a result, the user's data is kept secure. Moreover, parallel processing and resource use related to the electronic activity and addition activity-related service are made more efficient due to reduced duplication of processing and hardware components.

In some embodiments, to enable the user data-based workflows, a computer component including an initiator component 110, the agnostic workflow platform 120 and an activity verification system 160 utilize a specialized activity verification request 103 to leverage the existing user profile associated with the user. Using the specialized activity verification request 103, the initiator component 110 can interface with the activity verification system 160 and the agnostic workflow platform 120 to trigger data and token exchanges that enable the user data-based workflow to be provided as a service to the initiator component 110 without compromising (e.g., opening to cyber-attack, etc.) the user data.

In some embodiments, a user data-based workflow may include any suitable actions-sequence formed of a sequence of computational and/or network actions to provide a service to the user. In some embodiments, the actions sequence may include actions for identifying a criterion associated with a particular device and/or particular user and/or particular electronic activity and performing a set of actions based on the criterion to provide a notification, display, service, data, or other service to the particular device and/or particular user. Thus, the actions sequence may be device-specific, user-specific, and/or customized based any suitable parameter or any combination thereof. For example, actions sequence may include generating and sending a notification based on the criterion, where the notification and/or criterion may be customized and/or configured specifically for the device and/or for the user.

In some embodiments, the initiator component 110 may be a third-party computing device or system with which a user may use to initiate an electronic activity with the third-party. For example, the initiator component 110 may be, e.g., a social network server, cloud storage system, online payment system, point-of-sale device, website account server, or other system and/or device for electronic activities.

In some embodiments, the initiator component 110 may rely on an external activity verification system 160, such as, e.g., a password service, a password management service, a social network, an identity management system, a financial institution system, or other suitable computer-based system that may manage and/or verifies user identity and user-related electronic activities. Accordingly, in some embodiments, upon the user entering into an electronic activity with the initiator component 110, an authorization request generator 111 of the initiator component 110 may be configured to receive electronic activity data, user data, entity data, and/or other activity-related data. In some embodiments, the data may be provided, e.g., by user input via a user interface, by third-party input via the user interface, and/or being automatically generated based, at least in part, on electronic activity attribute(s), or a combination thereof.

In some embodiments, the user may input user identity data, such as, e.g., a user identifier (e.g., name), a user account identifier, a user credential (e.g., password, personal identification number (PIN), biometric login, among others and combinations thereof), and other user identity data. In some embodiments, one or more of the user identity data items may be automatically determined or received. For example, the user may present an authentication device for executing electronic activities, such as, e.g., a hardware authentication device, two-factor authentication device, identity, or account card (e.g., credit card, debit card, personnel badge, etc.), or other device. Such a device may interact with the initiator component 110 to automatically provide user identity data and, in at least some embodiments, user credential data (e.g., cryptographic signatures, cryptographic keys, etc.).

In some embodiments, the user and/or the entity may provide electronic activity details, such as, e.g., a third-party identifier, an initiator device identifier, an activity type, an activity operation, an activity value, an activity quantity, among other electronic activity details. In some embodiments, one or more of the electronic activity details may be automatically generated based on data input by the user or entity or both. The authorization request generator 111 may be pre-programmed to generate one or more of the electronic activity details based on certain inputs by the user, entity, or both. For example, the entity may input a physical object effected by or otherwise associated with the electronic activity, and the authorization request generator 111 may automatically generate user-related, activity-related data such as the activity type, activity operation, activity value, and/or any other activity-related parameter (e.g., frequency, quantity, etc.) based on the physical object associated with the electronic activity.

In some embodiments, based on the electronic activity, certain workflows may be advantageous for providing data and information to the user, the entity or both. For example, a status of a transaction for food or for an online purchase may be better communicated to the user through direct contact. In another example, a user profile creation at a website or social network may be made more efficient and secure by data sharing via an account or identity management system. Accordingly, based on, e.g., the activity type or activity operation or other suitable activity-related data item, the authorization request generator 111 may be configured to automatically generate a workflow identifier identifying a requested workflow service, workflow type identifier identifying a workflow type, or both.

In some embodiments, the authorization request generator 111 may be configured to generate the activity verification request 103 based on the activity-related data. Accordingly, the authorization request generator 111 may append the activity-related data and the workflow identifier or workflow type or both to an electronic message to form the activity verification request 103. The activity verification request 103 may have a format configured to provide the activity-related data to the activity verification system 160 for verification of the electronic activity.

In some embodiments, the activity verification request 103 may be a structured data message having predetermined data fields for specifying corresponding data items, e.g., according to a messaging or message standard. For example, the activity verification request 103 may have one or more data fields for one or more of, e.g., the user identifier, the user account identifier, the user credential, the third-party identifier, the initiator device identifier, the activity type, the activity operation, the activity value, the activity quantity, the workflow identifier, the workflow type, or other data item or combinations thereof. As a result, the activity verification system 160 may receive the activity verification request 103 and identify the authorization request to verify the electronic activity. In some embodiments, the data fields may conform to a standard, such as, e.g., an application programming interface (API) specification, standardized messaging structure (e.g., according to an International Organization for Standardization (ISO) standard), or other format for electronic messages.

In some embodiments, the initiator component 110 may include a data field in the activity verification request 103 specifying the device identifier and/or the third-party identifier. In some embodiments, the initiator component 110 may be registered with the activity verification system 160, e.g., via the device identifier and/or the third-party identifier, as participating in providing workflows to users. For example, the device identifier and/or the third-party identifier may have an initiator profile in a profile service 170 of the activity verification system 160. The initiator profile may include an attribute, flag, parameters, or other data item signifying the eligibility of initiator component 110 for providing workflows for the users. The initiator profile may enable a tokenization service 180 to interface with the agnostic workflow platform 120 to verify workflow requests. In some embodiments, the initiator profile may be omitted, and workflow requests can be verified against electronic activities without screening by the initiator profile.

In some embodiments, the initiator component 110 may communicate the activity verification request 103 to the activity verification system 160 to verify the electronic activity so that it may be executed or otherwise completed. In some embodiments, the activity verification request 103 may be communicated as an electronic message via any suitable messaging protocol or API, such as, e.g., a request-response or request-reply protocol, a publish-subscribe protocol, or any suitable communication protocol.

In some embodiments, the initiator component 110 and the activity verification system 160 may communicate via wired or wireless interfaces. For example, the connection may be a wireless network connection, such as a cellular network, WiFi, Bluetooth, Zigbee, Z-Wave, or other wireless network. In another example, the connection be a wired connection, such as, e.g., fiber optic, ethernet, coaxial, or other wired connection in a wired network such as, e.g., broadband, local area network, wide area network, or other suitable wired network. In some embodiments, the initiator component 110 and activity verification system 160 may be in communication with each other via a combination of wired networks, wired connections, wireless networks and wireless connections.

In some embodiments, the activity verification system 160 may receive the activity verification request 103 and verify the electronic activity. In some embodiments, the activity verification system 160 may be a part of the user computing device 101.

In some embodiments, the activity verification system 160 may implement computer engines for the profile service 170 to manage profiles, the workflow management service 140 to authorize and manage the provision of a workflow service to the initiator component 110, and the tokenization service 130 to secure access to the workflow service via token-based credentials.

In some embodiments, the profile service 170 may utilize the activity verification request 103 to identify the profile associated with the user and verify that the electronic activity is authentic as being associated with the user. In order to implement the profile service 170, the profile service 170 may be include one or more computer engines that may include software components, hardware components, or a combination thereof. For example, each computer engine may include a dedicated processor and storage. In some embodiments, the computer engines share hardware resources, including the processor and storage of the activity verification system 160 via, e.g., a bus. Thus, the profile service 170 may include a memory including software and software instructions, such as, e.g., profile management and electronic activity verification, among other profile-related functionalities.

In some embodiments, as described above, the activity verification request 103 may include a structured data format for recording the data related to the electronic activity for which verification is requested. In some embodiments the profile service 170 may parse the data of the activity verification request 103 to extract, e.g., the user identifier, the profile identifier, or other identifier. In some embodiments, the activity verification request 103 may be an unstructured electronic message. Accordingly, the profile service 170 may utilize, e.g., natural language processing, or other technique for parsing unstructured data and automatically identifying the user identifier or profile identifier.

In some embodiments, using the user identifier, profile identifier, or other identifier, the profile service 170 may search the storage, e.g., using a suitable database query, text search, index look-up, or other search technique to identify and access the profile associated with the user participating in the electronic activity. As a result, the profile service 170 may associated the activity verification request 103 with the profile of the user.

Accordingly, in some embodiments, the profile service 170 may parse the data of the activity verification request 103 to extract the activity-related data. The activity-related data may be compared to data in the profile to determine whether the electronic activity is in fact associated with the user as opposed to a fraudulent or otherwise incorrect request, such as, e.g., a fraudulent transaction, an unverifiable login request, an impersonation in social media or fraudulent communication, among other unverifiable activities. Accordingly, data items such as, e.g., the activity type, the activity operation, the activity value or activity quantity, the activity date, the activity location, the entity, among other data can be analyzed in view of user behaviors to determine whether the electronic activity is being performed by the user and not someone else.

In some embodiments, in order to verify the activity, the profile service 170 may use the activity-related data from the activity verification request 103 with, e.g., software logic or rules for similarity to data in, e.g., the user profile, verified history, activity history, among other data and combinations thereof. For example, in some embodiments, the profile service 170 may, e.g., use past user behaviors using data mining, machine learning, statistical analysis and other techniques. Alternatively, or additionally, the profile service 170 may use other verification techniques to ensure that the electronic activity is verified only when it is authentic and correct, including, e.g., using external authentication services and cryptographic authentication.

In some embodiments, based on the verification of the electronic activity associated with the activity verification request 103, the profile service 170 may append the activity verification to a response message 104. In some embodiments, the activity verification system 160 may return the response message 104 to authorize the initiator component 110 to execute the electronic activity. Moreover, in some embodiments, the profile service 170 may log the activity verification request 103 and the response message 104 in the profile associated with the user. The log may specify the activity-related data and the authorization of the electronic activity, and the registration of the initiator component 110 for workflow services.

In some embodiments, upon receiving the response message 104 indicating authorization of the electronic activity, the initiator component 110 may implement a workflow request generator 112 to request instantiation of a workflow by the agnostic workflow platform 120. In some embodiments, the workflow request generator 112 may track a status of the electronic activity and generate a workflow request 105 based on the status. The workflow request generator 112 may issue the workflow request 105, e.g., periodically, upon at least one trigger condition that triggers the workflow request 105, or by any other trigger or any combination thereof. For example, one or more trigger conditions may include, e.g., without limitation, order status changes based on an electronic activity including an order of a product or service (e.g., food delivery status, reservation status, vehicle maintenance/repair status, product maintenance/repair status, etc.), file download/transfer/upload status changes (e.g., download/transfer/upload start, in progress, complete, etc.), ride share status changes (e.g., en-route to pick-up, nearby to pick-up, waiting for pick-up, en-route to destination, nearby to destination, drop-off complete, etc.), among other trigger conditions in one or more electronic activities, or any combination thereof. In some embodiments, the trigger may be periodic updates according to, e.g., one minute, two-minute, three-minute, four-minute, five-minute, ten-minute, fifteen-minute, twenty-minute, twenty-five-minute, thirty-minute, forty-five-minute, one hour, two-hour, three-hour, four-hour, five-hour, six-hour, eight-hour, ten-hour, twelve-hour, one day or any other suitable period based on the electronic activity or any combination thereof.

In some embodiments, the workflow request generator 112 may formulate the workflow request 105 based on the trigger conditions. In some embodiments, depending on the electronic activity being executed, the workflow being request may be responsive to certain conditions. For example, in a food service transaction, the trigger conditions may be the food being ready to serve or ready for pickup or other status and combinations thereof. Similarly, for an online ordering transaction, the trigger condition may include a shipment of the online order or other status and combinations thereof. In some embodiments, where the trigger conditions are satisfied, the workflow request generator 112 may generate the workflow request 105 and append one or more trigger conditions, as well as, e.g., a workflow identifier, the user identifier, the initiator device identifier, the third-party identifier, the activity type, the activity operation, or other activity-related data and combinations thereof.

In some embodiments, the workflow identifier may specify a particular type of workflow for effectuating a particular functionality. For example, the workflow identifier may specify workflows including, e.g., a notification service, a social media posting service, an automated payment service, an automated scheduling service, or other suitable workflow or any combination thereof.

In some embodiments, the workflow request 105 may be sent to the agnostic workflow platform 120 to request the workflow to be performed. In some embodiments, the workflow request generator 112 may interface with the agnostic workflow platform 120 to provide the workflow request 105 via a suitable interface, such as, e.g., an API, a messaging adapter, or other software processor or system to cause the workflow to be executed. For example, the workflow request generator 112 may provide the workflow request 105 to the agnostic workflow platform 120 via a suitable API call.

In some embodiments, the agnostic workflow platform 120 may implement computer engines for a tokenization service 130 to generate and verify actions-sequence tokens to authenticate the workflow request 105 via token-based credentials, and a workflow management service 140 to authorize and manage the provision of a workflow service to the initiator component 110.

In some embodiments, at least one workflow request 105 may include a structured data format for recording the data related to the electronic activity for which verification is requested. In some embodiments the tokenization service 130 may parse the data of the workflow request 105 to extract, e.g., the user identifier, the user profile identifier, the entity identifier, the initiator device identifier, the workflow identifier, an electronic activity identifier, an activity verification system identifier associated with the activity verification system 160, and/or other identifier and/or other attributes or any combination thereof. In some embodiments, the tokenization service 130 may be an unstructured electronic message. Accordingly, the tokenization service 130 may utilize, e.g., natural language processing or other technique(s) for parsing unstructured data and automatically identifying the user identifier or account identifier.

Accordingly, in some embodiments, the tokenization service 130 may parse the data of the workflow request 105 to extract workflow-related data. The workflow-related data may be used to determine whether the electronic activity is in fact associated with the user, a registered initiator component/entity, and/or a valid workflow, as opposed to a fraudulent or otherwise incorrect request (e.g., a fraudulent transaction, an unverifiable login request, an impersonation in social media, fraudulent communication, other unverifiable activities).

In some embodiments, the tokenization service 130 may generate a secure and identifiable actions-sequence token enabling the workflow management service 140 to perform the request for the workflow. In some embodiments, the tokenization service 130 may utilize the identified workflow and the electronic activity as specified in the workflow request 105 to generate the secure token. In order to implement the tokenization service 130, the tokenization service 130 may include one or more computer engines that may include software components, hardware components, or a combination thereof. For example, each computer engine may include a dedicated processor and storage. In some embodiments, the computer engines share hardware resources, including the processor 122 and storage 121 of the agnostic workflow platform 120 via, e.g., a bus. Thus, the tokenization service 130 may include a memory including software and software instructions, such as, e.g., account management and electronic activity verification, among other account-related functionalities.

In some embodiments, the tokenization service 130 may extract the indicator of the workflow verification as well as the workflow type or workflow identifier from the workflow request 105. In some embodiments, based on the indicator, the tokenization service 130 may generate a digital actions-sequence token that represents permission to request a workflow and access the workflow functionality. Thus, in some embodiments, the tokenization service 130 may generate, e.g., a one-time use token, such as, e.g., a one-time password, a cryptographic hash, a message authentication code (MAC), or other limited use token. For example, the tokenization service 130 may tokenize some or all the data of the workflow request 105 using, e.g., a randomly generated value, a cryptographic hash of the indicator, or a combination of a cryptographic hash with the indicator and the randomly generated value. In an example, the tokenization may also include the third-party identifier, or a device identifier associated with the initiator component 110 in the cryptographic hash to, e.g., ensure the requester requesting a workflow is an authorized requester according to an identifier associated with the requester. Accordingly, the tokenization service 130 may produce tokens of varying security levels that are specific to the initiator device (device specific), to the user (user specific), to the third-party (entity specific), to the activity verification system (activity verification system specific), or to any other suitable device and/or entity or any combination thereof.

In some embodiments, the tokenization service 130 may generate and record the token and the associated electronic activity and/or workflow using, e.g., a distributed ledger such as a blockchain, including, e.g., Bitcoin, Ethereum, or other blockchain technologies. In some embodiments, the exemplary computer-based systems/platforms, the exemplary computer-based devices, and/or the exemplary computer-based components of the present disclosure may be configured interact and/or to store data in one or more private and/or private-permissioned cryptographically-protected, distributed databased such as, without limitation, a blockchain (distributed ledger technology), Ethereum (Ethereum Foundation, Zug, Switzerland), and/or other similar distributed data management technologies. For example, as utilized herein, the distributed database(s), such as distributed ledgers ensure the integrity of data by generating a chain of data blocks linked together by cryptographic hashes of the data records in the data blocks. For example, a cryptographic hash of at least a portion of data records within a first block, and, in some cases, combined with a portion of data records in previous blocks is used to generate the block address for a new digital identity block succeeding the first block. As an update to the data records stored in the one or more data blocks, a new data block is generated containing respective updated data records and linked to a preceding block with an address based upon a cryptographic hash of at least a portion of the data records in the preceding block. In other words, the linked blocks form a blockchain that inherently includes a traceable sequence of addresses that can be used to track the updates to the data records contained therein. The linked blocks (or blockchain) may be distributed among multiple network nodes within a computer network such that each node may maintain a copy of the blockchain. Malicious network nodes attempting to compromise the integrity of the database must recreate and redistribute the blockchain faster than the honest network nodes, which, in most cases, is computationally infeasible. In other words, data integrity is guaranteed by the virtue of multiple network nodes in a network having a copy of the same blockchain. In some embodiments, as utilized herein, a central trust authority for sensor data management may not be needed to vouch for the integrity of the distributed database hosted by multiple nodes in the network.

In some embodiments, the exemplary distributed blockchain-type ledger implementations of the present disclosure with associated devices may be configured to affect transactions involving Bitcoins and other cryptocurrencies into one another and into (or between) so-called FIAT money or FIAT currency and vice versa.

In some embodiments, the exemplary distributed blockchain-type ledger implementations of the present disclosure with associated devices are configured to utilize smart contracts that are computer processes that facilitate, verify and/or enforce negotiation and/or performance of one or more particular activities among users/parties. For example, an exemplary smart contract may be configured to be partially or fully self-executing and/or self-enforcing. In some embodiments, the exemplary inventive asset-tokenized distributed blockchain-type ledger implementations of the present disclosure may utilize smart contract architecture that can be implemented by replicated asset registries and contract execution using cryptographic hash chains and Byzantine fault tolerant replication. For example, each node in a peer-to-peer network or blockchain distributed network may act as a title registry and escrow, thereby executing changes of ownership and implementing sets of predetermined rules that govern transactions on the network. For example, each node may also check the work of other nodes and in some cases, as noted above, function as miners or validators.

In some embodiments, in order to ensure the initiator component 110 accesses only the workflow for which it is authorized, the tokenization service 130 may verify the token with the activity verification system 160.

Additionally, in some embodiments, the agnostic workflow platform 120 may provide a secure and confidential workflow platform that would enable workflows without maintaining user data. Rather, the agnostic workflow platform 120 may use the token for the workflow request 105 to request a temporary or one-time use access to user data for effectuating the requested workflow. Accordingly, in some embodiments, the agnostic workflow platform 120 may include an interface 150 for interfacing with the activity verification system 160. In some embodiments, the interface 150 may enable third-party integration with the agnostic workflow platform 120 for providing secured and confidential workflows to users across any one or more activity verification systems.

In some embodiments, the interface 150 may extract from the workflow request 105 the activity verification system identifier that identifies the activity verification system 160. In some embodiments, when the workflow request 105 does not specify the activity verification system identifier, the interface 150 may determine the activity verification system 160 based on, e.g., electronic activity identifier, the user identifier, the initiator device identifier, the entity identifier, among other data from the workflow request 105 or any combination thereof. For example, the interface 150 may include an address index or mapping that correlates the activity verification system 160 to one or more of the data from the workflow request 105. As a result, the interface 150 may issue a workflow authorization request to the activity verification system 160, e.g., via a suitable API pull request, a message according to a suitable message adapter, or by any other suitable interfacing technology. In response, the activity verification system 160 may verify and provide user data for executing the workflow.

In some embodiments, rather than identifying the activity verification system 160, the interface 150 may publish the workflow authorization request via a publish-subscribe modality. Accordingly, the associated activity verification system 160 may inspect the workflow authorization request and respond with a verification and user data for workflow execution.

In some embodiments, the interface 150 may instead receive a push request and/or published message (via the publish-subscribe modality) from the activity verification system 160. The activity verification system 160 may generate a separate token independently and in parallel to the agnostic workflow platform 120 and may provide the separate token and/or user data for the workflow via the interface 150 without a request from the interface 150.

In some embodiments, to enable the agnostic workflow platform 120 to execute the requested workflow, the activity verification system 160 may verify the actions-sequence token. To do so, the activity verification system 160 may utilize a tokenization service 180 to generate an actions-sequence token for each activity verification request, including the activity verification request 103. Similar to the tokenization service 130, the tokenization service 180 may generate a digital token that represents permission to execute a workflow for a user. Thus, in some embodiments, the tokenization service 180 may generate, e.g., a one-time use token, such as, e.g., a one-time password, a cryptographic hash, a message authentication code (MAC), or other limited use token. For example, the tokenization service 180 may tokenize electronic activity-related data from the activity verification request 103 using, e.g., a randomly generated value, a cryptographic hash of the indicator, or a combination of a cryptographic hash with the indicator and the randomly generated value. In an example, the tokenization may also include the third-party identifier, or a device identifier associated with the initiator component 110 in the cryptographic hash to, e.g., ensure the requester requesting a workflow is an authorized requester according to an identifier associated with the requester. Accordingly, the tokenization service 130 may produce tokens of varying security levels.

In some embodiments, to ensure compatibility, the tokenization service 180 and the tokenization service 130 may use the same data items to generate the actions-sequence tokens. For example, e.g., of the tokenization service 180 and the tokenization service 130 may identify, e.g., the user identifier, the user profile identifier, the entity identifier, the initiator device identifier, the electronic activity identifier, a time, a date, among other data items or any combination thereof. The actions-sequence tokens may each then be generated using the same algorithm, such as the same cryptographic hashing or other suitable algorithm. As a result, one actions-sequence token may be used to verify the other such that the workflow request 105 can be matched to the activity verification request 103. In some embodiments, if the tokens are matched and the workflow request 105 is associated with a particular activity verification request, the tokenization service 180 may nevertheless invalidate the actions-sequence token if the response message 104 did not authorize the electronic activity. Thus, where the electronic activity is invalidated, the activity verification system 160 may also invalidate the workflow request 105.

In some embodiments, the actions-sequence token produced by the activity verification system 160 may be linked to the electronic activity logged in the profile service 170 for which the token is generated. Thus, in some embodiments, the tokenization service 180 compare the token from the tokenization service 130 to match the workflow request 105 to the activity verification request 103 based on the logged data in the profile service 170 and identify the electronic activity including attributes thereof, such as the user identifier associated therewith.

In some embodiments, upon matching the actions-sequence token(s), thus validating the workflow request 105 and identifying the user via the user identifier, the tokenization service 180 may generate a workflow execution authorization. In some embodiments, the workflow execution authorization may include, e.g., a verification confirmation indicating that the workflow request 105 matches the activity verification request 103 and workflow-related user data. For example, in some embodiments, the workflow authorization request may specify a workflow type and/or workflow data requirements. Thus, the tokenization service 180 may determine the data requirements for workflow-related data based on the workflow type and/or the workflow data requirements. Accordingly, the workflow execution authorization may include the workflow-related data, such as, e.g., user contact information, a user computing device identifier, a user social media account, a user blog, a user address, or other user information necessary for executing the workflow or any combination thereof.

In some embodiments, rather than providing the workflow-related data to the agnostic workflow platform 120 with the workflow execution authorization, the agnostic workflow platform 120 may maintain, e.g., in the storage 121, a copy of the user profile associated with each activity verification system that interfaces with the agnostic workflow platform 120. Thus, activity verification system 160 may verify the actions-sequence token and return the workflow execution authorization indicating the verification of the token without communicating any user data. In some embodiments, each activity verification system that interfaces with the agnostic workflow platform 120 may update the user profiles storing user data in the agnostic workflow platform 120 via periodic uploads. For example, the user profiles may be updated upon each period including, e.g., six hours, eight hours, twelve hours, twenty-four hours, two days, three days, four days, five days, six days, seven days, two weeks, three weeks, four weeks, one month, two months, three months, four months, six months, one year, etc.

In some embodiments, upon verifying the workflow request 105, the tokenization service 130 may add the workflow request 105 and/or the workflow data associated with the workflow request 105 to a workflow queue 124, e.g., in the storage 121. In some embodiments, the workflow queue 124 may establish an order of execution of each workflow request received by the agnostic workflow platform 120. In some embodiments, the order may be a first-in-first-out (FIFO) queue or may be ordered based time of receiving the workflow request 105, time of receiving a workflow execution authorization, priority value and/or flag, location, a due data, or any other suitable ordering methodology or any combination thereof.

In some embodiments, the workflow management service 140 may access the verification and the workflow request 105 in the workflow queue 124 based on the ordering and may identify an associated workflow and execute the workflow for the initiator component 110. In some embodiments, the workflow may include a preconfigured sequence of actions constructed of one or more modules or functions of instructions. In some embodiments, the instructions may include customized instructions, customized combinations of instructions, template instructions, or other suitable software construct to define the set of actions in the actions sequence. In some embodiments, the workflow library 123 may store a library of registered instructions, sets of instruction combinations of instructions, templates of instructions, functions defined by instructions, modules defined by instructions, actions formed by one or more instructions, sequences of actions, or other suitable library of the preconfigured sequences of actions that form each workflow in the workflow library 123.

In order to implement the workflow management service 140, the workflow management service 140 may include one or more computer engines that may include software components, hardware components, or a combination thereof. For example, each computer engine may include a dedicated processor and storage. In some embodiments, the computer engines share hardware resources, including the processor 122 and storage 121 of the agnostic workflow platform 120 via, e.g., a bus. Thus, the workflow management service 140 may include a memory including software and software instructions, such as, e.g., workflow management, workflow authentication and workflow execution, among other workflow management-related functionalities.

In some embodiments, the workflow management service 140 may parse the data of the workflow request 105 to extract, e.g., the workflow type, the workflow identifier, or other identifier. In some embodiments, the workflow request 105 may be an unstructured electronic message. Accordingly, the workflow management service 140 may utilize, e.g., natural language processing, or other technique for parsing unstructured data and automatically identifying the workflow type, the workflow identifier, or other identifier.

In some embodiments, using the workflow type and/or the workflow identifier, the workflow management service 140 may reference the workflow library 123, e.g., using a suitable database query, text search, index look-up, or other search technique to identify and access a registered workflow corresponding to the workflow associated with the workflow request 105.

In some embodiments, the workflow management service 140 authorizes the initiator component 110 to access the identified workflow associated with the workflow request 105. For example, in some embodiments, the workflow library 123 may include permissioned and/or participating third-party entities. Such permissioned or participating third-party entities may be specified in workflow records that define each workflow. For example, a workflow record can include attributes defining a particular workflow, such as, e.g., a workflow type, a workflow identifier, a workflow function, third-party identifiers identifying permissioned or participating third-party entities, as well as any other suitable characteristics and attributes of each workflow. Based on the listed third-party identifiers in the record of the identified workflow of the workflow request 105, the workflow management service 140 may authorize the entity for access to the workflow functions via the agnostic workflow platform 120.

In some embodiments, upon validation, the workflow management service 140 may manage the workflow service to execute the appropriate workflow using user data received form the activity verification system 160 via the interface 150 in the workflow execution authorization, such as, e.g., contact information or other user information. In some embodiments, the workflow management service 140 may trigger the execution of the workflow and output the workflow output 107 to the user computing device 101. In some embodiments, the workflow output 107 may include workflow functionality such as, e.g., issuing a workflow output 107 to the user computing device 101. For example, the workflow may generate a status update notification that notifies the user of the status of the electronic activity. The status update notification may then be sent to the user computing device 101 according to the user's contact information while protecting the contact information from third-party access and improving convenience for the user.

Figure 2:
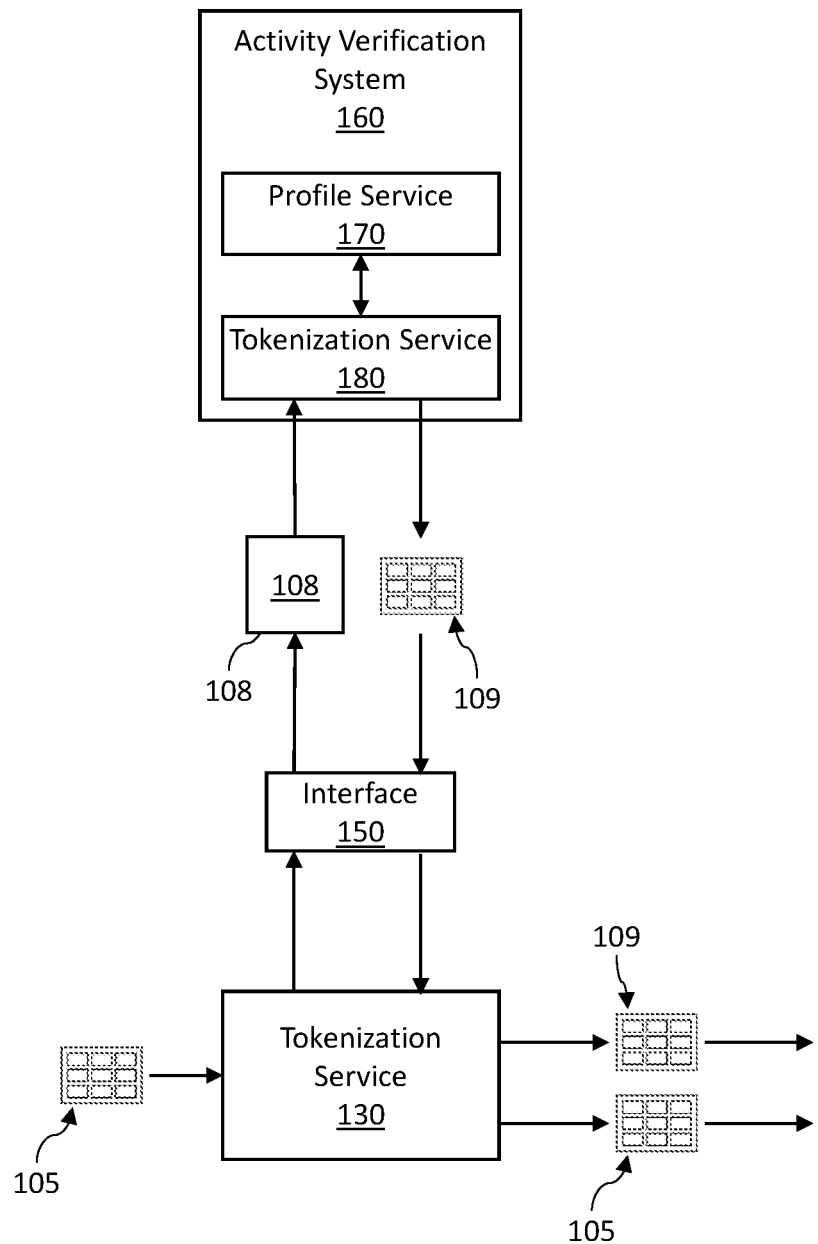
FIG. 2 is a block diagram of another exemplary computer-based system for an agnostic secure workflow service using the tokenization service 130 in accordance with one or more embodiments of the present disclosure.

FIG. 2 is a block diagram of another exemplary computer-based system for an agnostic secure workflow service using the tokenization service 130 in accordance with one or more embodiments of the present disclosure. In some embodiments, the tokenization service 130 may communicate with the tokenization service 180 and profile service 170 of the activity verification system 160 through the interface 150 as described above.

In some embodiments, the workflow request 105 may be provided to the agnostic workflow platform 110. In some embodiments, the workflow request 105 may include workflow attributes that may be used to define or otherwise determine a specific sequence of actions to be performed based on the attributes of the workflow request 105 and/or private user data. In some embodiments, the attributes of the workflow request 105 may include, e.g., a user identifier, a user profile identifier, an initiator device identifier, an entity identifier of an entity associated with an electronic activity, one or more electronic activity data (e.g., type, data, quantity, event indicator(s) indicating the occurrence of one or more events associated with the electronic activity, etc.), one or more workflow parameters (e.g., workflow type, actions to be performed, output type, scheduled execution data and/or time, one or more criteria for triggering and/or executing the workflow among other workflow parameters or any combination thereof), among other attributes or any combination thereof. For example, the workflow request 105 may include a fulfillment notification request for an electronic activity including a purchase transaction at an entity including a merchant of goods and/or services. In such an example, the workflow request 105 may include attributes including, e.g., an entity identifier including a merchant identifier, an electronic activity identifier including a transaction ID, electronic activity data including transaction details such as item or service purchase, quantity purchased, location of transaction, time of transaction, fulfillment status of the purchase, value of the purchase, among other transaction details or any combination thereof, and/or workflow parameters including fulfillment notification details (e.g., the fulfillment status), among other attributes or any combination thereof.

In some embodiments, upon ingesting the workflow request 105 and generating the associated action-sequence token, the tokenization service 130 may verify the token with the tokenization service 180 of the activity verification system 160. Thus, the tokenization service 130 may ensure the initiator component 110 accesses only the workflow for which it is authorized in a secure and confidential manner.

Additionally, in some embodiments, the agnostic workflow platform 120 provides a secure and confidential workflow platform that enables workflows without maintaining user data. Rather, the agnostic workflow platform 120 may use the token for the workflow request 105 to request a temporary or one-time use access to user data for effectuating the requested workflow. Accordingly, in some embodiments, the agnostic workflow platform 120 may include an interface 150 for interfacing with the activity verification system 160. In some embodiments, the interface 150 may enable third-party integration with the agnostic workflow platform 120 for providing secured and confidential workflows to users across any one or more activity verification systems.

In some embodiments, the interface 150 may extract from the workflow request 105 the activity verification system identifier that identifies the activity verification system 160. In some embodiments, where the workflow request 105 does not specify the activity verification system identifier, the interface 150 may determine the activity verification system 160 based on, e.g., electronic activity identifier, the user identifier, the initiator device identifier, the entity identifier, among other data from the workflow request 105 or any combination thereof. For example, the interface 150 may include an address index or mapping that correlates the activity verification system 160 to one or more of the data from the workflow request 105. As a result, the interface 150 may issue a workflow authorization request 108 to the activity verification system 160, e.g., via a suitable API pull request, a message according to a suitable message adapter, or by any other suitable interfacing technology. In response, the activity verification system 160 may verify and provide user data for executing the workflow.

In some embodiments, rather than identifying the activity verification system 160, the interface 150 may publish the workflow authorization request 108 via a publish-subscribe modality. Accordingly, the associated activity verification system 160 may inspect the workflow authorization request 108 and respond with a verification and user data for workflow execution.

In some embodiments, the interface 150 may instead receive a push request and/or published message (via the publish-subscribe modality) from the activity verification system 160. The activity verification system 160 may generate a separate action-sequence token independently and in parallel to the agnostic workflow platform 120 and may provide the separate action-sequence token and/or user data for the workflow via the interface 150 without a request from the interface 150.

In some embodiments, to enable the agnostic workflow platform 120 to execute the requested workflow, the activity verification system 160 may verify the action-sequence token. To do so, the activity verification system 160 may utilize a tokenization service 180 to generate an action-sequence token for each activity verification request, including the activity verification request 103. Similar to the tokenization service 130, the tokenization service 180 may generate a digital action-sequence token that represents permission to execute a workflow for a user. Thus, in some embodiments, the tokenization service 180 may generate, e.g., a one-time use token, such as, e.g., a one-time password, a cryptographic hash, a message authentication code (MAC), or other limited use token. For example, the tokenization service 180 may tokenize electronic activity-related data from the activity verification request 103 using, e.g., a randomly generated value, a cryptographic hash of the indicator, or a combination of a cryptographic hash with the indicator and the randomly generated value. In an example, the tokenization may also include the third-party identifier, or a device identifier associated with the initiator component 110 in the cryptographic hash to, e.g., ensure the requester requesting a workflow is an authorized requester according to an identifier associated with the requester. Accordingly, the tokenization service 130 may produce tokens of varying security levels.

In some embodiments, to ensure compatibility, the tokenization service 180 and the tokenization service 130 may use the same data items to generate the tokens. For example, e.g., of the tokenization service 180 and the tokenization service 130 may identify, e.g., the user identifier, the third-party identifier, the initiator device identifier, the electronic activity identifier, a time, a date, among other data items or any combination thereof. The action-sequence tokens may each then be generated using the same algorithm, such as the same cryptographic hashing or other suitable algorithm. As a result, one action-sequence token may be used to verify the other action-sequence token such that the workflow request 105 can be matched to the activity verification request 103. In some embodiments, if the action-sequence tokens are matched and the workflow request 105 is associated with a particular activity verification request, the tokenization service 180 may nevertheless invalidate the action-sequence token if the response message 104 did not authorize the electronic activity. Thus, where the electronic activity is invalidated, the activity verification system 160 may also invalidate the workflow request 105.

In some embodiments, the action-sequence token produced by the activity verification system 160 may be linked to the electronic activity logged in the profile service 170 for which the token is generated. Thus, in some embodiments, the tokenization service 180 compare the token from the tokenization service 130 to match the workflow request 105 to the activity verification request 103 based on the logged data in the profile service 170 and identify the electronic activity including attributes thereof, such as the user identifier associated therewith.

In some embodiments, upon matching the action-sequence tokens, thus validating the workflow request 105 and identifying the user via the user identifier, the tokenization service 180 may generate a workflow execution authorization 109. In some embodiments, the workflow execution authorization 109 may include, e.g., a verification confirmation indicating that the workflow request 105 matches the activity verification request 103 and workflow-related user data. For example, in some embodiments, the workflow authorization request 108 may specify a workflow type and/or workflow data requirements. Thus, the tokenization service 180 may determine the data requirements for workflow-related data based on the workflow type and/or the workflow data requirements. Accordingly, the workflow execution authorization 109 may include the workflow-related data, such as, e.g., user contact information, a user computing device identifier, a user social media account, a user blog, a user address, or other user information necessary for executing the workflow or any combination thereof. The workflow request 105 and the workflow-related data of the workflow execution authorization 109 may then be provided to the workflow management service 140 for identification, orchestration, and execution of the associated workflow on behalf of the initiator component 110.

Figure 3:
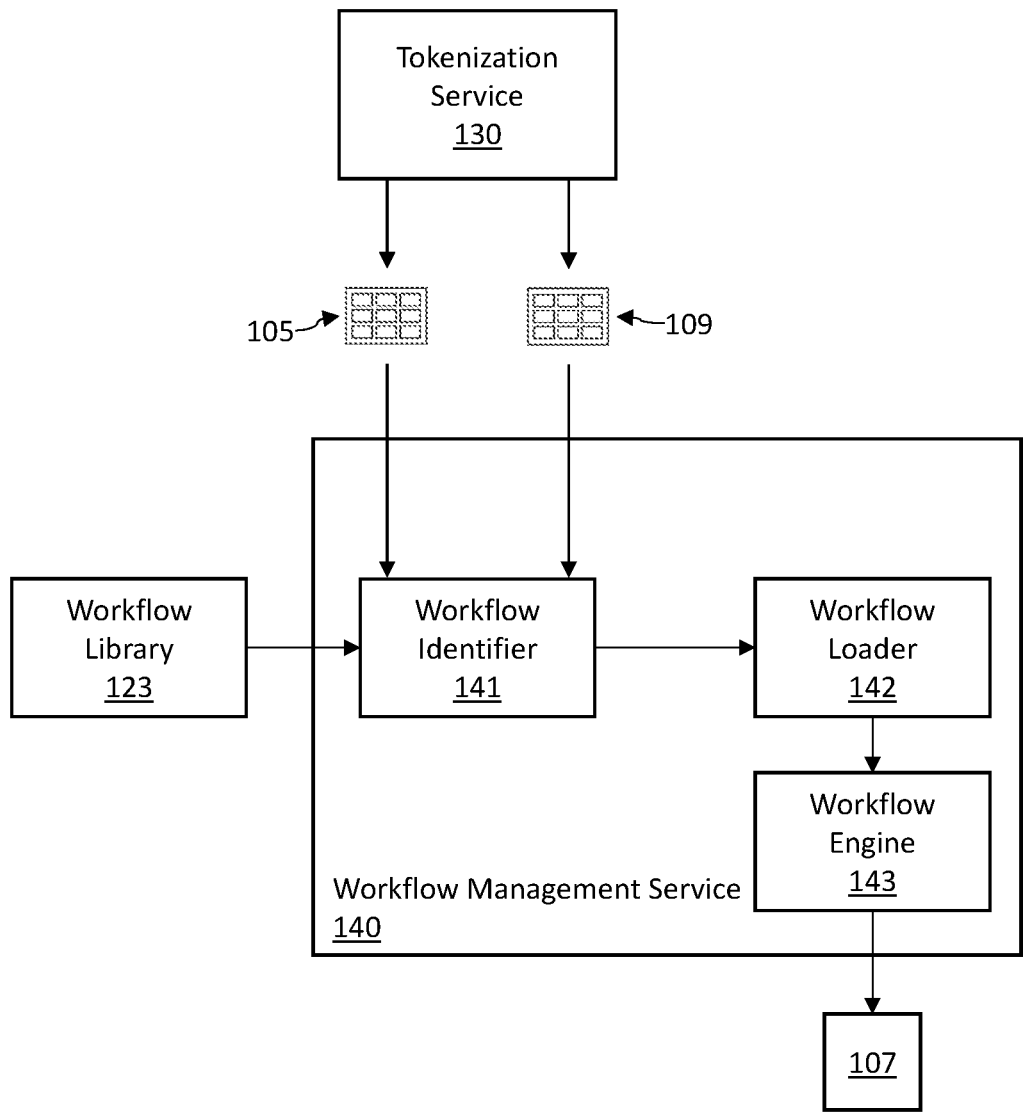
FIG. 3 is a block diagram of another exemplary computer-based system for an agnostic secure workflow service using a workflow management service in accordance with one or more embodiments of the present disclosure.

FIG. 3 is a block diagram of another exemplary computer-based system for an agnostic secure workflow service using a workflow management service in accordance with one or more embodiments of the present disclosure. In some embodiments, the workflow management service 140 may communicate with the tokenization service 130 as described above. The workflow management service 140 may include a workflow identifier 141, a workflow loader 142 and a workflow engine 143 to identify, load and execute a workflow from the workflow library 123. Each of the workflow identifier 141, the workflow loader 142 and the workflow engine 143 may be each include components such as at least one software component and/or a combination of at least one software component and at least one hardware component which are designed/programmed/configured to manage/control other software and/or hardware components (such as the libraries, software development kits (SDKs), objects, etc.).

In some embodiments, the workflow management service 140 may receive the workflow request 105 and the workflow-related data of the workflow execution authorization 109, e.g., from the tokenization service 130. In some embodiments, the initiator component 110 is associated with an entity with which a user is engaging in an electronic activity.

In some embodiments, the workflow request 105 includes data fields based on a message standard. For example, some request messages include standard data structures with standard data fields depending on the service provider (e.g., an operator of the systems and services associated with the workflow management service 140). In some embodiments, the message standard may include one or more data fields for requesting secure workflows for providing functionality to the entity and the user.

In some embodiments, the data field(s) of the workflow request 105 may indicate a secure workflow for providing a service to the user in a secure manner that maintains user data confidentiality. In some embodiments, a workflow identifier 141 of the workflow management service 140 may utilize the auxiliary data field to extract a workflow identifier of the workflow request. Using the data in the auxiliary data field, the workflow identifier 141 may consult a workflow library 123 to identify an associated workflow file. The workflow file may include, e.g., a secure workflow, workflow type data, workflow permissions data, among other workflow data and information for each registered workflow registered with the workflow management service 140 and stored in the workflow library 123. Thus, the workflow identifier 141 can identify and access the particular secure workflow associated with the workflow request 105.

In some embodiments, in order to ensure the initiating device accesses only the workflow for which it is authorized and that only the initiating device accesses the workflow, the tokenization service 130 may link the token to the workflow. Thus, the workflow execution authorization 109 validating the token to authorize the workflow is associated with a device-specific actions-sequence token. For example, in some embodiments, the activity verification system 160 and/or the workflow management service 140 may include, e.g., an index, library, look-up-table, a blockchain or other data structure to catalog the token and the associated workflow, as well as any other suitable data, such as, e.g., the third-party identifier, the initiator device identifier, the activity identifier or activity type, the user identifier, among any other suitable data.

In some embodiments, the validation of the token via the workflow execution authorization 109 authorizations the workflow identifier 141 to provide the workflow request 105, the associated workflow identifier and the workflow-related data to a workflow loader 142 to identify and load the secure workflow from the workflow library 123. In some embodiments, the workflow loader 142 may utilize the workflow identifier to reference the workflow library 123, e.g., according to a look-up-table, index, database query, search, or other suitable technique. In some embodiments, the entry in the workflow library 123 associated with the secure workflow may store or otherwise link to the secure workflow. For example, the secure workflow may be a locally stored or cloud service stored software program that is loaded by the workflow library 123. In other examples, the secure workflow may be an external service that is called using, e.g., a suitable API request by the entry in the workflow library 123. Other techniques for loading the software functionality associated with the secure workflow are also contemplated.

In some embodiments, upon loading the secure workflow for providing functionality on behalf of the initiating device, a workflow engine 143 may execute the secure workflow. Accordingly, an instance of the secure workflow is created and executed on behalf of the initiating device to provide a device-specific secure workflow.

In some embodiments, the secure workflow, when executed, may perform user data related actions on behalf of the initiating device. Thus, user data related actions may be triggered by the initiating device without the initiating device handling or accessing the user data, maintaining security of the user data. Because the activity verification system validates the workflow request 105 and has an existing relationship with the user, including an existing user profile with, e.g., contact information as well as other user information, the agnostic workflow platform may leverage that relationship to enable the entity to provide services to the user without the entity having the infrastructure or user data to do so, thus improving functionality of the initiating device by operating on its behalf upon receipt of a valid workflow request 105. Moreover, the agnostic workflow platform may interface with any number of additional activity verification systems to enable access to user data in a secure manner for users associated with any one or more of the activity verification systems without control of the user data leaving the activity verification systems.

In some embodiments, to further improve the security of the user data, the workflow engine 143 may be permissioned to access confidentially stored user data, such as, e.g., an encrypted user profile or other encrypted user data. Such encrypted data may be inaccessible to outside devices, ensuring security and confidentiality.

In some embodiments, the workflow engine 143 may execute the secure workflow according to the workflow request 105, which may specify, e.g., an electronic activity status related to a status of the electronic activity. In some embodiments, the workflow request 105 may include workflow attributes that may be used to define or otherwise determine a specific sequence of actions to be performed based on the attributes of the workflow request 105 and/or private user data. In some embodiments, the attributes of the workflow request 105 may include, e.g., a user identifier, a user profile identifier, an initiator device identifier, an entity identifier of an entity associated with an electronic activity, one or more electronic activity data (e.g., type, data, quantity, event indicator(s) indicating the occurrence of one or more events associated with the electronic activity, etc.), one or more workflow parameters (e.g., workflow type, actions to be performed, output type, scheduled execution data and/or time, one or more criteria for triggering and/or executing the workflow among other workflow parameters or any combination thereof), among other attributes or any combination thereof. For example, the workflow request 105 may include a fulfillment notification request for an electronic activity including a purchase transaction at an entity including a merchant of goods and/or services. In such an example, the workflow request 105 may include attributes including, e.g., an entity identifier including a merchant identifier, an electronic activity identifier including a transaction ID, electronic activity data including transaction details such as item or service purchase, quantity purchased, location of transaction, time of transaction, fulfillment status of the purchase, value of the purchase, among other transaction details or any combination thereof, and/or workflow parameters including fulfillment notification details (e.g., the fulfillment status), among other attributes or any combination thereof.

Thus, for example, the workflow may include one or more action sequences associated with performing transaction or service fulfillment status notifications, order fulfillment status notifications, multi-factor authentication token provision, among other statuses associated with performance and fulfillment of the electronic activity. Accordingly, the workflow engine 143 may use the electronic activity status to test a criterion associated with the workflow of the workflow request 105. Where the status satisfies the criterion, the workflow engine 143 may proceed to execute the sequence of actions of the workflow.

In some embodiments, the workflow engine 143 may utilize one or more of the attributes of the workflow request 105 as inputs to the associated action sequence. The sequence of action in the sequence may then process the attribute(s) to generate a workflow output 107 including, e.g., a status notification to notify a user of the activity status. For example, where the activity status includes a transaction fulfillment status, the secure workflow may generate a status notification including, e.g., an indication of the fulfillment status such as, e.g., processing, shipped, delivered, ready to serve, served, or other status. In another example, where the activity status includes a multifactor authentication token status, the secure workflow may generate a status notification including, e.g., a multifactor authentication token, an amount of time left for token validity, among other multifactor authentication token status information. In some embodiments, the secure workflow may also generate the multifactor authentication token in addition to the notification regarding the token. In some embodiments, the secure workflow may look up or reference an externally generated multifactor authentication token.

In some embodiments, the workflow engine 143 using the secure workflow may generate the status notification and determine user contact information. In some embodiments, the user contact information may include, e.g., an email address, a social media account, a device ID for push notifications, a telephone number (e.g., for an automated voice call or an automated text message), an internet messaging account, or other contact information. In some embodiments, the contact information may also include, e.g., user contact preferences. For example, the contact information in the user profile may be selectable by the user to include modes of communication (e.g., email, text message, phone call, internet message, social media, push notification, etc.). The selected modes of communication may be a global preference (e.g., for all communications and notifications), or may be specified for types of communications or sources of the communications. For example, the user profile may include a user specified contact preference for the entity associated with the initiating device. Accordingly, the workflow engine 143 may use the device identifier and/or entity identifier to determine the matching user preference to the entity.

In some embodiments, based on the contact information from the user profile of the activity verification system 160 and/or locally stored by the agnostic workflow platform 120, the workflow engine may transmit the status notification to the user computing device, e.g., using an associated API request or by another suitable mechanism.

In some embodiments, the workflow engine 143 may alternatively or additionally provide the workflow output 107 to the initiating device. For example, in some scenarios the user may be located at the initiating device. As a result, the workflow output 107 may be advantageously delivered to the initiating device to alert the user while at the initiating device's location, increasing the likelihood that the user receives the workflow output 107.

In some embodiments, because the token is tied to the workflow validated for the initiating device and the electronic activity, the token may expire upon transmission of the workflow output 107. In some embodiments, the expiration may be a result of a time limit elapsing, by the workflow engine 143 deleting the token, by the token including a hash as a function of a date of authorization, electronic activity identifier, or other data unique to the electronic activity for which the workflow output 107 is issued.

Accordingly, the workflow management service 140 may securely and efficiently provide functionality using user data on behalf of an initiating device to enhance initiating device functionality while maintaining security and confidentiality of user data.

Figure 4:
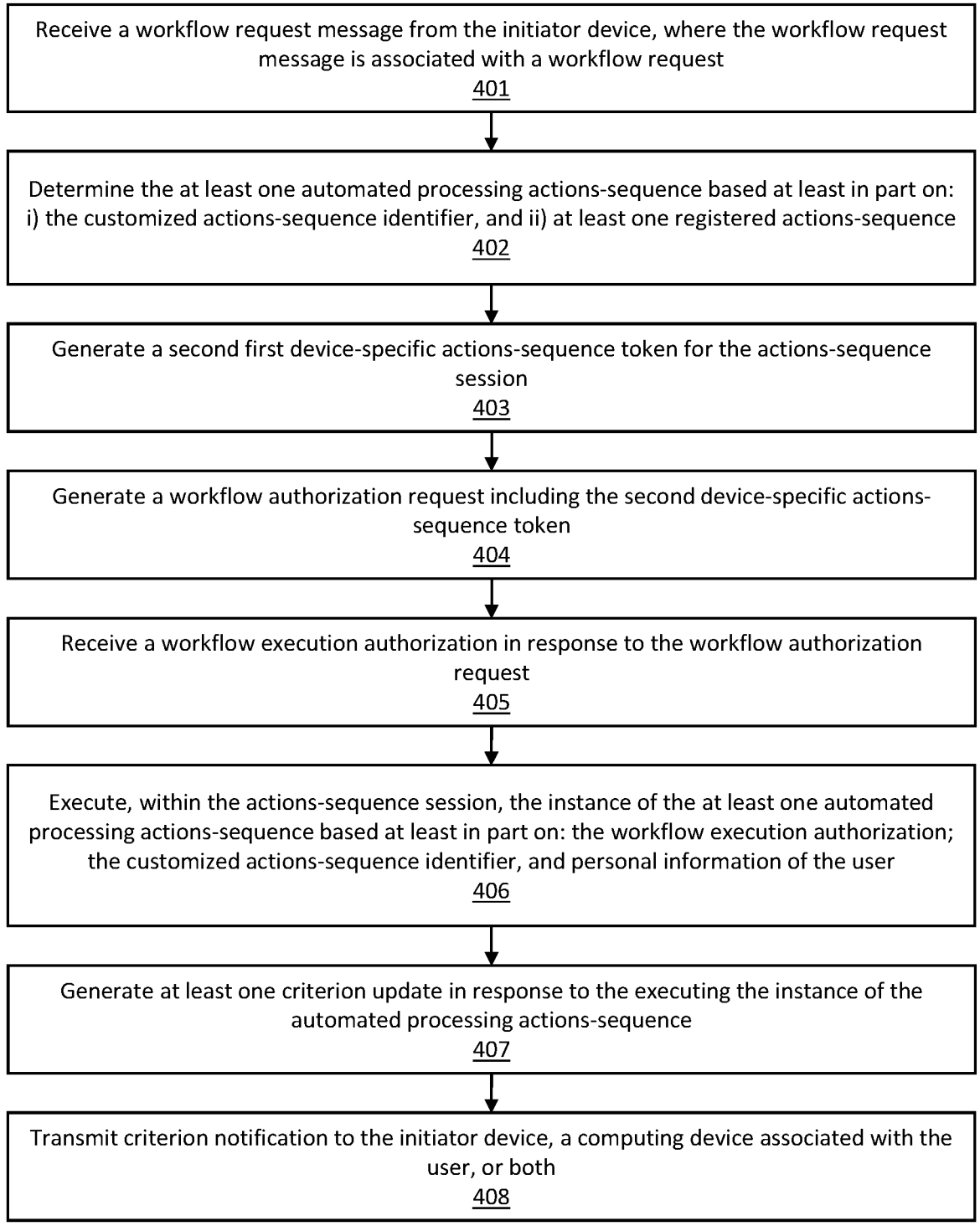
FIG. 4 illustrates a flowchart of an exemplary computer-based method for an agnostic secure workflow service in accordance with one or more embodiments of the present disclosure.

FIG. 4 illustrates a flowchart of an exemplary computer-based method for an agnostic secure workflow service in accordance with one or more embodiments of the present disclosure. In some embodiments, the method includes computer implemented steps 401 through 408 to enable the provision of services to a user based on user data while maintaining the confidentiality and security of the user data by preventing disclosure to a device with which the user is executing an electronic event and/or activity.

In some embodiments, at step 401, a system, such as the agnostic workflow platform 120 described above, may receive a workflow request message from the initiator device, where the workflow request message is associated with a workflow request. The workflow request message may include at least one user profile identifier identifying the user profile associated with the user, at least one entity identifier identifying the entity and an actions-sequence identifier identifying the at least one automated processing actions-sequence, including a plurality of instructions corresponding to a plurality of actions.

In some embodiments, at step 402, the system may determine the at least one automated processing actions-sequence based at least in part on the actions-sequence identifier and at least one registered actions-sequence. For example, the at least one automated processing actions-sequence may include a set of processing instructions that cause, e.g., the workflow management service 140 or other suitable instance of an actions-sequence session to perform the workflow and provide a specified service to the user.

In some embodiments, at step 403, the system may generate a first device-specific actions-sequence token for the actions-sequence session. In some embodiments, the first device-specific actions-sequence token may be based on the workflow request message. For example, the system may produce a hash of the workflow request message and/or the data carried by the workflow request message using, e.g., a suitable hash function and/or cryptographic cipher for any other suitable tokenization.

In some embodiments, at step 404, the system may generate a workflow authorization request including the first device-specific actions-sequence token. For example, the system may create the workflow authorization request to provide the first device-specific actions-sequence token to an authentication service, such as the activity verification system 160 described above. The authentication service may verify the first device-specific actions-sequence token based on data held at the authentication service, such as, e.g., an electronic event authentication message for an electronic event executed by a user from an initiator device associated with an entity.

In some embodiments, at step 405, the system may receive a workflow execution authorization in response to the workflow authorization request. In some embodiments, the workflow execution authorization may include a verification that the first device-specific actions-sequence token matches a second device-specific actions-sequence token, and user data of the user.

In some embodiments, the second device-specific actions-sequence token is based on the electronic event authentication message and the hash or other suitable tokenization used to create the first device-specific actions-sequence token. In some embodiments, the electronic event authentication message may include the at least one user profile identifier identifying the user profile associated with the user, and the at least one entity identifier identifying the entity, e.g., as specified to execute the electronic event at the initiator device.

In some embodiments, at step 406, the system may execute, within the actions-sequence session, the instance of the at least one automated processing actions-sequence based at least in part on the workflow execution authorization, the actions-sequence identifier, and the user data of the user. In some embodiments, the user data of the user confidentially stored separate from the entity, e.g., at the authentication service.

In some embodiments, at step 407, the system may generate at least one criterion update in response to the executing of the instance of the automated processing actions-sequence.

In some embodiments, at step 408, the system may transmit a criterion notification to the initiator device, a computing device associated with the user (e.g., the user computing device 101), or both. In some embodiments, the criterion notification includes an indication of the at least one criterion update.

Figure 5:
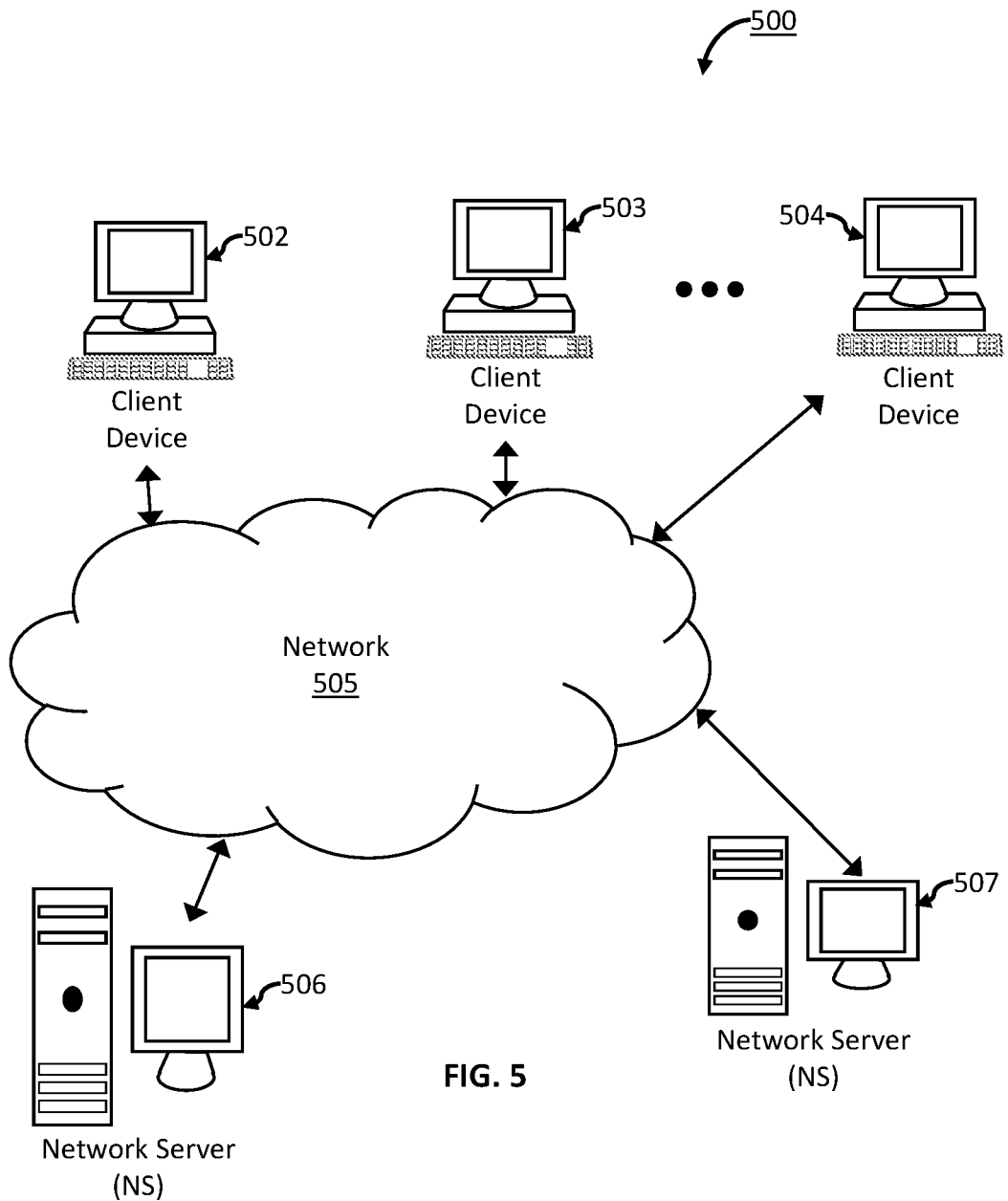
FIG. 5 depicts a block diagram of an exemplary computer-based system and network for an agnostic secure workflow service in accordance with one or more embodiments of the present disclosure.

FIG. 5 depicts a block diagram of an exemplary computer-based system and network 500 for utilizing the agnostic workflow platform 120 to provide secure workflow functionality to third-party devices while maintaining the confidentiality and security of user data in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the illustrative computing devices and the illustrative computing components of the exemplary computer-based system and network 500 may be configured to manage a large number of devices and concurrent operations, as detailed herein. In some embodiments, the exemplary computer-based system and network 500 may be based on a scalable computer and network architecture that incorporates varies strategies for assessing the data, caching, searching, and/or database connection pooling. An example of the scalable architecture is an architecture that is capable of operating multiple servers.

In some embodiments, referring to FIG. 5, member computing device 502, member computing device 503 and member computing device 504 (e.g., clients) of the exemplary computer-based system and network 500 may include one or more user computing devices 101 and/or initiator components 110, including virtually any computing devices capable of receiving and sending a message over a network (e.g., cloud network), such as network 505, to and from another computing device, such as servers 506 and 507, each other, and the like.

In some embodiments, the member computing devices 502 through 504 may be personal computers, multiprocessor systems, microprocessor-based or programmable consumer electronics, network PCs, and the like. In some embodiments, one or more member computing devices within member computing devices 502 through 504 may include computing devices that typically connect using a wireless communications medium such as cell phones, smart phones, pagers, walkie talkies, radio frequency (RF) devices, infrared (IR) devices, CBs, integrated devices combining one or more of the preceding devices, or virtually any mobile computing device, and the like. In some embodiments, one or more member computing devices within member computing devices 502-504 may be devices that are capable of connecting using a wired or wireless communication medium such as a PDA, POCKET PC, wearable computer, a laptop, tablet, desktop computer, a netbook, a video game device, a pager, a smart phone, an ultra-mobile personal computer (UMPC), and/or any other device that is equipped to communicate over a wired and/or wireless communication medium (e.g., NFC, RFID, NBIOT, 3G, 4G, 5G, GSM, GPRS, WiFi, WiMax, CDMA, satellite, ZigBee, etc.). In some embodiments, one or more member computing devices within member computing devices 502 through 504 may include may run one or more applications, such as Internet browsers, mobile applications, voice calls, video games, videoconferencing, and email, among others. In some embodiments, one or more member computing devices within member computing devices 502 through 504 may be configured to receive and to send web pages, and the like. In some embodiments, an exemplary specifically programmed browser application of the present disclosure may be configured to receive and display graphics, text, multimedia, and the like, employing virtually any web based language, including, but not limited to Standard Generalized Markup Language (SMGL), such as HyperText Markup Language (HTML), a wireless application protocol (WAP), a Handheld Device Markup Language (HDML), such as Wireless Markup Language (WML), WMLScript, XML, JavaScript, and the like. In some embodiments, a member computing device within member computing devices 502-504 may be specifically programmed by either Java, .Net, QT, C, C++ and/or other suitable programming language. In some embodiments, one or more member computing devices within member computing devices 502-504 may be specifically programmed include or execute an application to perform a variety of possible tasks, such as, without limitation, messaging functionality, browsing, searching, playing, streaming, or displaying various forms of content, including locally stored or uploaded messages, images and/or video, and/or games.

In some embodiments, the exemplary network 505 may provide network access, data transport and/or other services to any computing device coupled to it in order to execute electronic events and/or operations, including requesting workflows from the agnostic workflow service 120 to receive software services leveraging user data without sharing the user data with the member computing device 502 through 504. In some embodiments, the exemplary network 505 may include and implement at least one specialized network architecture that may be based at least in part on one or more standards set by, for example, without limitation, Global System for Mobile communication (GSM) Association, the Internet Engineering Task Force (IETF), and the Worldwide Interoperability for Microwave Access (WiMAX) forum. In some embodiments, the exemplary network 505 may implement one or more of a GSM architecture, a General Packet Radio Service (GPRS) architecture, a Universal Mobile Telecommunications System (UMTS) architecture, and an evolution of UMTS referred to as Long Term Evolution (LTE). In some embodiments, the exemplary network 505 may include and implement, as an alternative or in conjunction with one or more of the above, a WiMAX architecture defined by the WiMAX forum. In some embodiments and, optionally, in combination of any embodiment described above or below, the exemplary network 505 may also include, for instance, at least one of a local area network (LAN), a wide area network (WAN), the Internet, a virtual LAN (VLAN), an enterprise LAN, a layer 3 virtual private network (VPN), an enterprise IP network, or any combination thereof. In some embodiments and, optionally, in combination of any embodiment described above or below, at least one computer network communication over the exemplary network 505 may be transmitted based at least in part on one of more communication modes such as but not limited to: NFC, RFID, Narrow Band Internet of Things (NBIOT), ZigBee, 3G, 4G, 5G, GSM, GPRS, WiFi, WiMax, CDMA, satellite and any combination thereof. In some embodiments, the exemplary network 505 may also include mass storage, such as network attached storage (NAS), a storage area network (SAN), a content delivery network (CDN) or other forms of computer or machine-readable media.

In some embodiments, the exemplary server 506 and/or the exemplary server 507 may be a web server (or a series of servers) running a network operating system, examples of which may include but are not limited to Microsoft Windows Server, Novell NetWare, or Linux. In some embodiments, the exemplary server 506 or the exemplary server 507 may be used for and/or provide cloud and/or network computing. Although not shown in FIG. 5, in some embodiments, the exemplary server 506 or the exemplary server 507 may have connections to external systems like email, SMS messaging, text messaging, ad content providers, etc. Any of the features of the exemplary server 506 may be also implemented in the exemplary server 507 and vice versa.

In some embodiments, one or more of the exemplary servers 506 and 507 may be specifically programmed to host the agnostic workflow platform 120 and/or the activity verification system 160 described above, including provisioning memory and/or compute resources such as the processor 122 and/or storage 121. In some embodiments, one or more of the exemplary servers 506 and 507 may be specifically programmed to perform, in non-limiting example, as authentication servers, search servers, email servers, social networking services servers, SMS servers, IM servers, MMS servers, exchange servers, photo-sharing services servers, advertisement providing servers, financial/banking-related services servers, travel services servers, or any similarly suitable service-base servers for users of the member computing device 502, member computing device 503 through member computing device 504.

In some embodiments and, optionally, in combination of any embodiment described above or below, for example, one or more exemplary computing member computing devices 502 through 504, the exemplary server 506, and/or the exemplary server 507 may include a specifically programmed software module that may be configured to send, process, and receive information using a scripting language, a remote procedure call, an email, a tweet, Short Message Service (SMS), Multimedia Message Service (MMS), instant messaging (IM), internet relay chat (IRC), mIRC, Jabber, an application programming interface, Simple Object Access Protocol (SOAP) methods, Common Object Request Broker Architecture (CORBA), HTTP (Hypertext Transfer Protocol), REST (Representational State Transfer), or any combination thereof.

Figure 6:
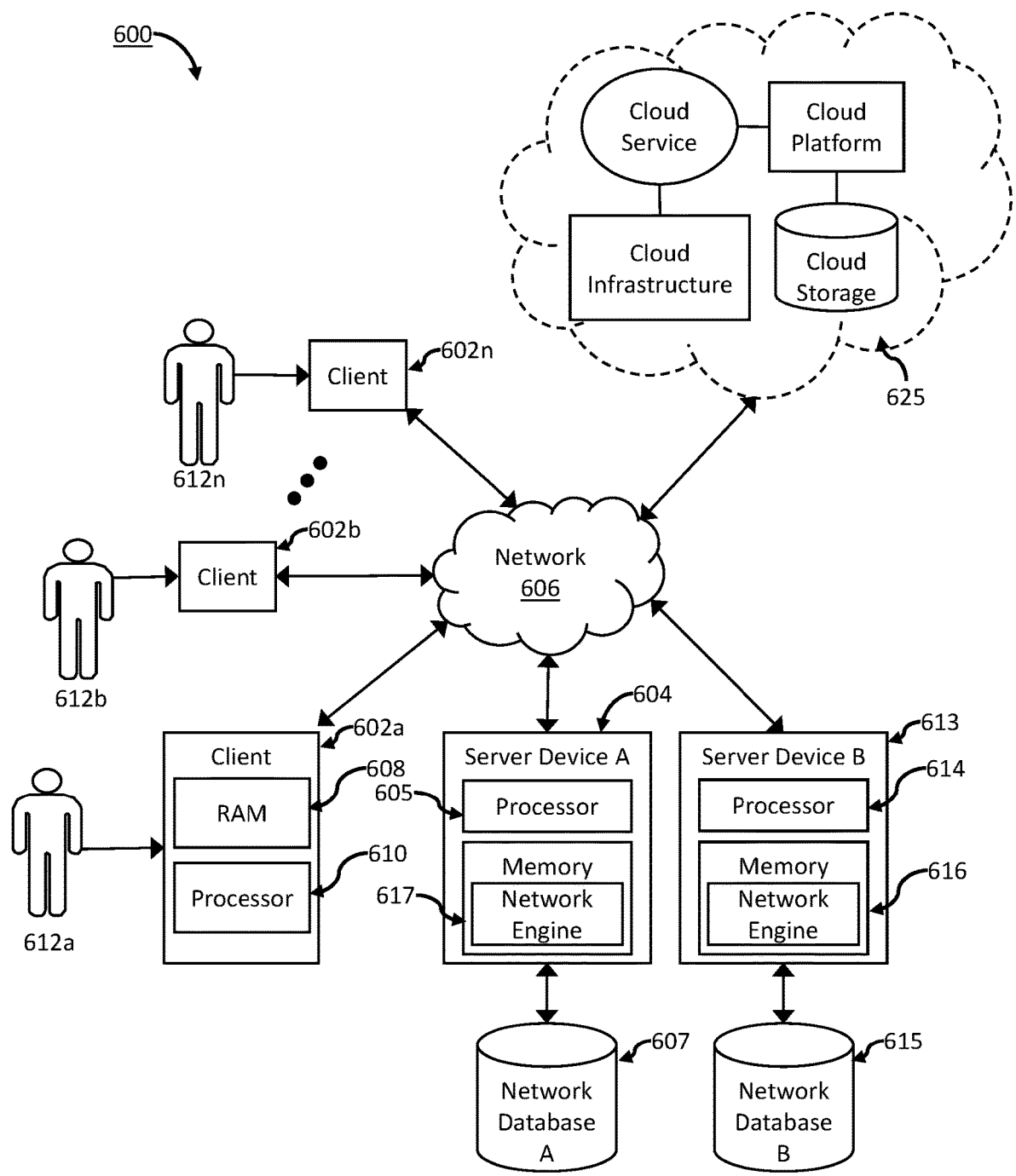
FIG. 6 depicts a block diagram of another exemplary computer-based system and network for an agnostic secure workflow service in accordance with one or more embodiments of the present disclosure.

FIG. 6 depicts a block diagram of another exemplary computer-based system and network 600 for utilizing the agnostic workflow platform 120 to provide secure workflow functionality to third-party devices while maintaining the confidentiality and security of user data in accordance with one or more embodiments of the present disclosure. However, not all of these components may be required to practice one or more embodiments, and variations in the arrangement and type of the components may be made without departing from the spirit or scope of various embodiments of the present disclosure.

In some embodiments, the member computing devices 602a, 602b through 602n shown each may include a user computing device 101 and/or an initiator component 110 for receiving outputs from the agnostic workflow platform 120 and executing electronic events and/or operations. Thus, the member computing device 602a through 602n may include a computer-readable medium, such as a random-access memory (RAM) 608 coupled to a processor 610 or FLASH memory. In some embodiments, the processor 610 may execute computer-executable program instructions stored in memory 608. In some embodiments, the processor 610 may include a microprocessor, an ASIC, and/or a state machine. In some embodiments, the processor 610 may include, or may be in communication with, media, for example computer-readable media, which stores instructions that, when executed by the processor 610, may cause the processor 610 to perform one or more steps described herein. In some embodiments, examples of computer-readable media may include, but are not limited to, an electronic, optical, magnetic, or other storage or transmission device capable of providing a processor, such as the processor 610 of member computing device 602a, with computer-readable instructions. In some embodiments, other examples of suitable media may include, but are not limited to, a floppy disk, CD-ROM, DVD, magnetic disk, memory chip, ROM, RAM, an ASIC, a configured processor, all optical media, all magnetic tape, or other magnetic media, or any other medium from which a computer processor can read instructions. Also, various other forms of computer-readable media may transmit or carry instructions to a computer, including a router, private or public network, or other transmission device or channel, both wired and wireless. In some embodiments, the instructions may comprise code from any computer-programming language, including, for example, C, C++, Visual Basic, Java, Python, Perl, JavaScript, etc.

In some embodiments, member computing devices 602a through 602n may also comprise a number of external or internal devices such as a mouse, a CD-ROM, DVD, a physical or virtual keyboard, a display, or other input or output devices. In some embodiments, examples of member computing devices 602a through 602n (e.g., clients) may be any type of processor-based platforms that are connected to a network 606 such as, without limitation, personal computers, digital assistants, personal digital assistants, smart phones, pagers, digital tablets, laptop computers, Internet appliances, and other processor-based devices. In some embodiments, member computing device 602a, member computing device 602b through member computing device 602n may be specifically programmed with one or more application programs in accordance with one or more principles/methodologies detailed herein. In some embodiments, member computing devices 602a through 602n may operate on any operating system capable of supporting a browser or browser-enabled application, such as Microsoft™, Windows™, and/or Linux. In some embodiments, member computing devices 602a through 602n shown may include, for example, personal computers executing a browser application program such as Microsoft Corporation's Internet Explorer™, Apple Computer, Inc.'s Safari™, Mozilla Firefox, and/or Opera.

In some embodiments, through the member computing devices 602a through 602n, user 612a, user 612b through user 612n, may communicate over the exemplary network 606 with each other and/or with other systems and/or devices coupled to the network 606. As shown in FIG. 6, exemplary server device 604 and server device 613 may be also coupled to the network 606. Server device 604 may include processor 605 and memory 617, and server 613 may include processor 614 and memory 616. In some embodiments, one or more member computing devices 602a through 602n may be mobile clients. In some embodiments, the server device 604 and server device 613 may host the agnostic workflow platform 120 and/or the activity verification system 160 described above, including provisioning memory and/or compute resources such as the processor 122 and/or storage 121. Thus, the processors 605 and/or 614 may provide the processor 122 for the agnostic workflow platform 120. Similarly, the memory 616 and memory 617 may provide the storage 121 for the agnostic workflow platform 120.

In some embodiments, at least one database of exemplary databases 607 and 615 may be any type of database, including a database managed by a database management system (DBMS). In some embodiments, the databases 607 and 615 may be the storage 121 for storing the workflow library 123 of the agnostic workflow platform 120 and/or the workflow queue 124 of the agnostic workflow platform. In some embodiments, an exemplary DBMS-managed database may be specifically programmed as an engine that controls organization, storage, management, and/or retrieval of data in the respective database. In some embodiments, the exemplary DBMS-managed database may be specifically programmed to provide the ability to query, backup and replicate, enforce rules, provide security, compute, perform change and access logging, and/or automate optimization. In some embodiments, the exemplary DBMS-managed database may be chosen from Oracle database, IBM DB2, Adaptive Server Enterprise, FileMaker, Microsoft Access, Microsoft SQL Server, MySQL, PostgreSQL, and a NoSQL implementation. In some embodiments, the exemplary DBMS-managed database may be specifically programmed to define each respective schema of each database in the exemplary DBMS, according to a particular database model of the present disclosure which may include a hierarchical model, network model, relational model, object model, or some other suitable organization that may result in one or more applicable data structures that may include fields, records, files, and/or objects. In some embodiments, the exemplary DBMS-managed database may be specifically programmed to include metadata about the data that is stored.

Figure 7:
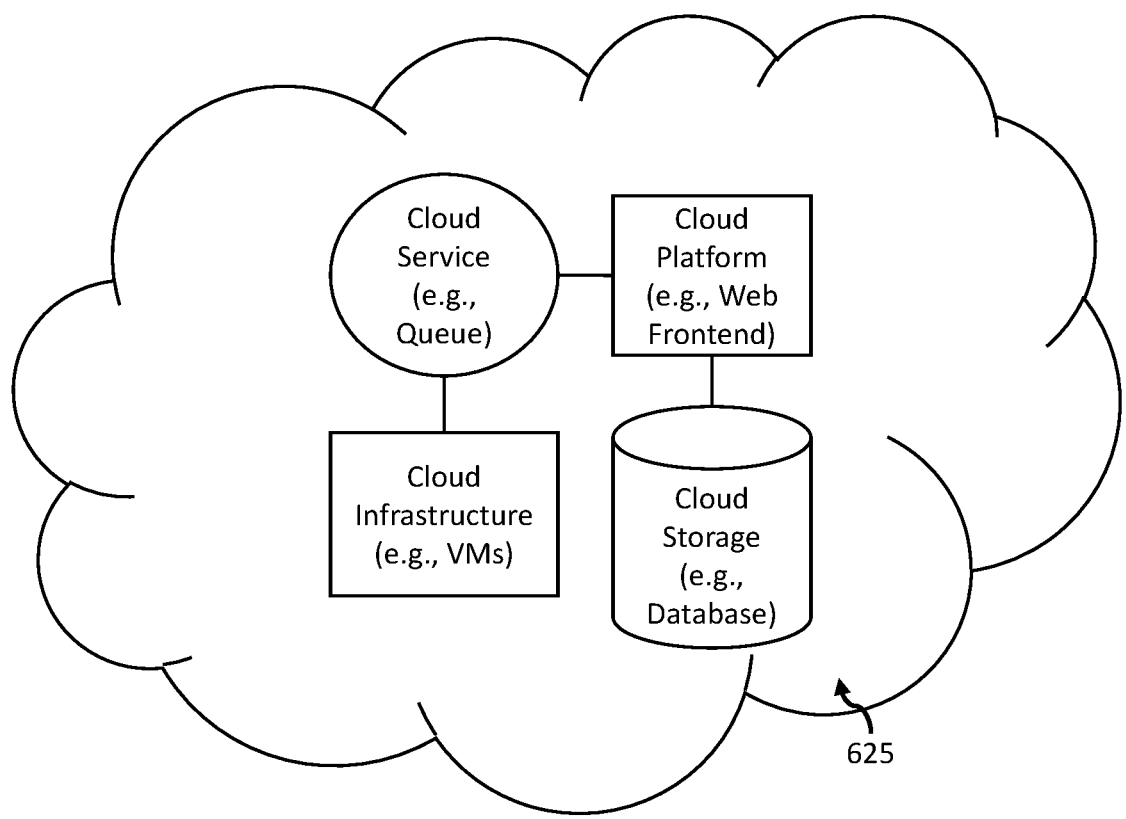
FIG. 7 depicts illustrative schematics of an exemplary implementation of the cloud computing/architecture(s) in which embodiments of a system for an agnostic secure workflow service may be specifically configured to operate in accordance with some embodiments of the present disclosure.
Figure 8:
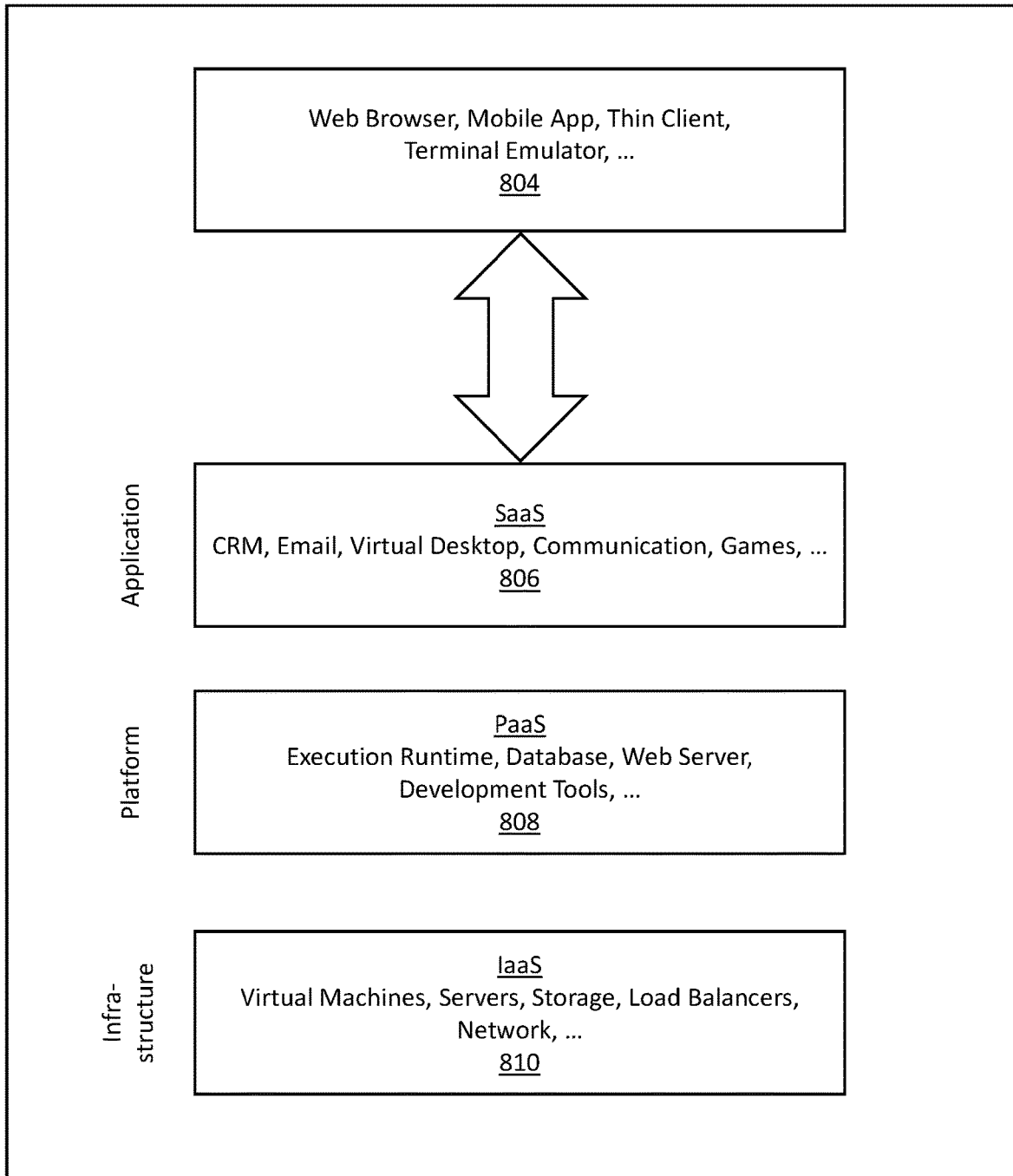
FIG. 8 depicts illustrative schematics of another exemplary implementation of the cloud computing/architecture(s) in which embodiments of a system for an agnostic secure workflow service may be specifically configured to operate in accordance with some embodiments of the present disclosure.

In some embodiments, the exemplary computer-based systems/platforms, the exemplary computer-based devices, and/or the exemplary computer-based components of the present disclosure may be specifically configured to operate in a cloud computing/architecture 625 such as, but not limiting to: infrastructure a service (IaaS) 810, platform as a service (PaaS) 808, and/or software as a service (SaaS) 806 using a web browser, mobile app, thin client, terminal emulator, or other endpoint 804. FIGS. 7 and 8 illustrate schematics of exemplary implementations of the cloud computing/architecture(s) in which the exemplary computer-based systems/platforms, the exemplary computer-based devices, and/or the exemplary computer-based components of the present disclosure may be specifically configured to operate.

It is understood that at least one aspect/functionality of the agnostic workflow platform 120 described herein can be performed in real-time and/or dynamically. As used herein, the term "real-time" is directed to an event/action that can occur instantaneously or almost instantaneously in time when another event/action has occurred. For example, the "real-time processing," "real-time computation," and "real-time execution" all pertain to the performance of a computation during the actual time that the related physical process (e.g., a user interacting with an application on a mobile device) occurs, in order that results of the computation can be used in guiding the physical process.

As used herein, the term "dynamically" and term "automatically," and their logical and/or linguistic relatives and/or derivatives, mean that certain events and/or actions can be triggered and/or occur without any human intervention. In some embodiments, events and/or actions in accordance with the present disclosure can be in real-time and/or based on a predetermined periodicity of at least one of: nanosecond, several nanoseconds, millisecond, several milliseconds, second, several seconds, minute, several minutes, hourly, several hours, daily, several days, weekly, monthly, etc.

As used herein, the term "runtime" corresponds to any behavior that is dynamically determined during an execution of a software application or at least a portion of software application.

In some embodiments, exemplary specially programmed computing systems and platforms with the agnostic workflow platform 120, the initiator component 110, the user computing device 101 and/or the activity verification system 160 may be configured to operate in the distributed network environment, communicating with one another over one or more suitable data communication networks (e.g., the Internet, satellite, etc.) and utilizing one or more suitable data communication protocols/modes such as, without limitation, IPX/SPX, X.25, AX.25, AppleTalk™, TCP/IP (e.g., HTTP), near-field wireless communication (NFC), RFID, Narrow Band Internet of Things (NBIOT), 3G, 4G, 5G, GSM, GPRS, WiFi, WiMax, CDMA, satellite, ZigBee, and other suitable communication modes.

The functions and process of the agnostic workflow platform 120, the initiator component 110, the user computing device 101 and/or the activity verification system 160 disclosed herein may be implemented in software or firmware or a combination of them or as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical, or other forms of propagated signals (e.g., carrier waves, infrared signals, digital signals, etc.), and others.

Computer-related systems, computer systems, and systems, such as the agnostic workflow platform 120, the initiator component 110, the user computing device 101 and/or the activity verification system 160, include any combination of hardware and software. Examples of software may include software components, programs, applications, operating system software, middleware, firmware, software modules, routines, subroutines, functions, methods, procedures, software interfaces, application program interfaces (API), instruction sets, computer code, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores," may be stored on a tangible, machine readable medium and supplied to various users or manufacturing facilities to load into the fabrication machines that make the logic or processor. Of note, various embodiments described herein may, of course, be implemented using any appropriate hardware and/or computing software languages (e.g., C++, Objective-C, Swift, Java, JavaScript, Python, Perl, QT, etc.).

In some embodiments, one or more of the agnostic workflow platform 120, the initiator component 110, the user computing device 101 and/or the activity verification system 160 may include or be incorporated, partially or entirely into at least one personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In some embodiments, as detailed herein, one or more of the agnostic workflow platform 120, the initiator component 110, the user computing device 101 and/or the activity verification system 160 of the present disclosure may obtain, manipulate, transfer, store, transform, generate, and/or output any digital object and/or data unit (e.g., from inside and/or outside of a particular application) that can be in any suitable form such as, without limitation, a file, a contact, a task, an email, a message, a map, an entire application (e.g., a calculator), data points, and other suitable data.

In some embodiments, as detailed herein, one or more of the agnostic workflow platform 120, the initiator component 110, the user computing device 101 and/or the activity verification system 160 may be implemented across one or more of various computer platforms such as, but not limited to: (1) Linux, (2) Microsoft Windows, (3) OS X (Mac OS), (4) Solaris, (5) UNIX (6) VMWare, (7) Android, (8) Java Platforms, (9) Open Web Platform, (10) Kubernetes or other suitable computer platforms. In some embodiments, illustrative computer-based systems or platforms of the present disclosure may be configured to utilize hardwired circuitry that may be used in place of or in combination with software instructions to implement features consistent with principles of the disclosure. Thus, implementations consistent with principles of the disclosure are not limited to any specific combination of hardware circuitry and software. For example, various embodiments may be embodied in many different ways as a software component such as, without limitation, a stand-alone software package, a combination of software packages, or it may be a software package incorporated as a "tool" in a larger software product.

For example, exemplary software specifically programmed in accordance with one or more principles of the present disclosure may be downloadable from a network, for example, a website, as a stand-alone product or as an add-in package for installation in an existing software application. For example, exemplary software specifically programmed in accordance with one or more principles of the present disclosure may also be available as a client-server software application, or as a web-enabled software application. For example, exemplary software specifically programmed in accordance with one or more principles of the present disclosure may also be embodied as a software package installed on a hardware device.

In some embodiments, the agnostic workflow platform 120, the initiator component 110, the user computing device 101 and/or the activity verification system 160 of the present disclosure may be configured to handle numerous concurrent users that may be, but is not limited to, at least 200 (e.g., but not limited to, 200-999), at least 2,000 (e.g., but not limited to, 2,000-9,999), at least 20,000 (e.g., but not limited to, 20,000-99,999), at least 200,000 (e.g., but not limited to, 200,000-999,999), at least 2,000,000 (e.g., but not limited to, 2,000,000-9,999,999), at least 20,000,000 (e.g., but not limited to, 20,000,000-99,999,999), at least 200,000,000 (e.g., but not limited to, 200,000,000-999,999,999), at least 2,000,000,000 (e.g., but not limited to, 2,000,000,000-999,999,999,999), and so on.

In some embodiments, the agnostic workflow platform 120, the initiator component 110, the user computing device 101 and/or the activity verification system 160 may be configured to output to distinct, specifically programmed graphical user interface implementations of the present disclosure (e.g., a desktop, a web app., etc.). In various implementations of the present disclosure, a final output may be displayed on a displaying screen which may be, without limitation, a screen of a computer, a screen of a mobile device, or the like. In various implementations, the display may be a holographic display. In various implementations, the display may be a transparent surface that may receive a visual projection. Such projections may convey various forms of information, images, or objects. For example, such projections may be a visual overlay for a mobile augmented reality (MAR) application.

In some embodiments, the illustrative computer-based systems or platforms of the present disclosure may be configured to securely store and/or transmit data by utilizing one or more of encryption techniques (e.g., private/public key pair, Triple Data Encryption Standard (3DES), block cipher algorithms (e.g., IDEA, RC2, RC5, CAST and Skipjack), cryptographic hash algorithms (e.g., MD5, RIPEMD-160, RTRO, SHA-1, SHA-2, Tiger (TTH), WHIRLPOOL, RNGs).

The examples are, of course, illustrative, and not restrictive.

As used herein, the term "user" shall have a meaning of at least one user. In some embodiments, the terms "user", "subscriber" "consumer" or "user" should be understood to refer to a user of an application or applications as described herein, and/or a consumer of data supplied by a data provider. By way of example, and not limitation, the terms "user" or "subscriber" can refer to a person who receives data provided by the data or service provider over the Internet in a browser session or can refer to an automated software application which receives the data and stores or processes the data.

At least some aspects of the present disclosure will now be described with reference to the following numbered clauses.

Clause 1. A method including:
  receiving, by the at least one processor, a workflow request message from the initiator device, where the workflow request message is associated with a workflow request;
    where the workflow request message includes:
      at least one user profile identifier identifying the user profile associated with the user,
      at least one entity identifier identifying the entity and
      an actions-sequence identifier identifying the at least one automated processing actions-sequence, including a plurality of instructions corresponding to a plurality of actions;
  determining, by the at least one processor, the at least one automated processing actions-sequence based at least in part on:
    the actions-sequence identifier and
    at least one registered actions-sequence;
  generating, by the at least one processor, a first device-specific actions-sequence token for the actions-sequence session;
    where the first device-specific actions-sequence token is based on the workflow request message;
  generating, by the at least one processor, a workflow authorization request including the second device-specific actions-sequence token;
  receiving, by the at least one processor, a workflow execution authorization in response to the workflow authorization request;
    where the workflow execution authorization includes:
      a verification that the first device-specific actions-sequence token matches a second device-specific actions-sequence token, and
      user data of the user;
      where the second device-specific actions-sequence token is based on an electronic event authentication message from an initiator device associated with an entity;
      where the electronic event authentication message includes:
        the at least one user profile identifier identifying the user profile associated with the user, and
        the at least one entity identifier identifying the entity;
  executing, by the at least one processor, within the actions-sequence session, the instance of the at least one automated processing actions-sequence based at least in part on:
    the workflow execution authorization;
    the actions-sequence identifier, and
    the user data of the user;
    where the user data of the user confidentially stored separate from the entity;
  generating, by the at least one processor, at least one criterion update in response to the executing the instance of the automated processing actions-sequence; and transmitting, by the at least one processor, a criterion notification to the initiator device, a computing device associated with the user, or both;
where the criterion notification includes an indication of the at least one criterion update.

Clause 2. A system including:
at least one processor configured to execute software instruction causing the at least one processor to perform steps to:
receive a workflow request message from the initiator device, where the workflow request message is associated with a workflow request;
where the workflow request message includes:
at least one user profile identifier identifying the user profile associated with the user,
at least one entity identifier identifying the entity and
an actions-sequence identifier identifying the at least one automated processing actions-sequence, including a plurality of instructions corresponding to a plurality of actions;
determine the at least one automated processing actions-sequence based at least in part on:
the actions-sequence identifier and
at least one registered actions-sequence;
generate a first device-specific actions-sequence token for the actions-sequence session;
where the first device-specific actions-sequence token is based on the workflow request message;
generate a workflow authorization request including the second device-specific actions-sequence token;
receive a workflow execution authorization in response to the workflow authorization request;
where the workflow execution authorization includes:
a verification that the first device-specific actions-sequence token matches a second device-specific actions-sequence token, and
user data of the user;
where the second device-specific actions-sequence token is based on an electronic event authentication message from an initiator device associated with an entity;
where the electronic event authentication message includes:
the at least one user profile identifier identifying the user profile associated with the user, and
the at least one entity identifier identifying the entity;
execute within the actions-sequence session, the instance of the at least one automated processing actions-sequence based at least in part on:
the workflow execution authorization;
the actions-sequence identifier, and
the user data of the user;
where the user data of the user confidentially stored separate from the entity;
generate at least one criterion update in response to the executing the instance of the automated processing actions-sequence; and
transmit a criterion notification to the initiator device, a computing device associated with the user, or both;
where the criterion notification includes an indication of the at least one criterion update.

Clause 3. A method including:
receiving, by the at least one processor, a workflow request message from an initiator device;
where the workflow request message includes:
at least one user profile identifier identifying a user profile of a user associated with the workflow request message,
at least one entity identifier identifying an entity associated with the initiator device, and
an actions-sequence identifier identifying a workflow including at least one automated processing actions-sequence;
generating, by the at least one processor, a first device-specific actions-sequence token based on the workflow request message;
receiving, by the at least one processor from at least one separate computer platform, a second device-specific actions-sequence token associated with electronic event authentication message;
executing, by the at least one processor, an instance of the at least one automated processing actions-sequence based at least in part on:
the first device-specific actions-sequence token matching the second device-specific actions-sequence token,
the actions-sequence identifier, and
user data of the user;
generating, by the at least one processor, at least one message in response to the executing the instance of the automated processing actions-sequence; and
transmitting, by the at least one processor, the at least one message to the initiator device, a computing device associated with the user, or both.

Clause 4. The system and/or method of any one or more of clauses 1 through 3, further including electronically communicating, by the at least one processor, the criterion notification to contact information identified in the user data, where the contact information identifies a communication address of the computing device.

Clause 5. The system and/or method of any of any one or more of clauses 1 through 4, where the contact information includes a telephone number specified in a user account at a financial institution and the criterion notification includes a text message to the telephone number.

Clause 6. The system and/or method of any one or more of clauses 1 through 3, where the first device-specific actions-sequence token is a one-time token that expires upon generating the at least one criterion update.

Clause 7. The system and/or method of any one or more of clauses 1 through 3, further including receiving, by the at least one processor, the electronic event authentication message via a payment advice and authorization message standard.

Clause 8. The system and/or method of any one or more of clauses 1 through 3 and/or 6, further including receiving, by the at least one processor, the workflow request message via an application programming interface (API) over the Internet.

Clause 9. The system and/or method of any one or more of clauses 1 through 3, where the initiator device includes a point-of-sale device.

Clause 10. The system and/or method of any one or more of clauses 1 through 3 and/or 7, where the point-of-sale device includes a payment system associated with a merchant.

Clause 11. The system and/or method of any one or more of clauses 1 through 3, further including receiving, by the at least one processor, a transaction fulfillment message as the at least one electronic message from a merchant associated with the initiator device, where the transaction fulfillment message indicates a fulfillment of a condition of a transaction associated with the workflow request message.

Clause 12. The system and/or method of any one or more of clauses 1 through 3, where the criterion notification includes a purchased item shipping confirmation.

While one or more embodiments of the present disclosure have been described, it is understood that these embodiments are illustrative only, and not restrictive, and that many modifications may become apparent to those of ordinary skill in the art, including that various embodiments of the disclosed methodologies, the illustrative systems and platforms, and the illustrative devices described herein can be utilized in any combination with each other. Further still, the various steps may be carried out in any desired order (and any desired steps may be added and/or any desired steps may be eliminated).

What is claimed is:

1. A method comprising:
receiving, by at least one processor, a workflow request message from an initiator device associated with an entity, wherein the workflow request message is associated with a workflow request;
  wherein the workflow request message comprises:
    at least one user profile identifier identifying the user profile associated with the user,
    at least one entity identifier identifying the entity, and
    an actions-sequence identifier identifying at least one automated processing actions-sequence, comprising a plurality of instructions corresponding to a plurality of actions;
determining, by the at least one processor, the at least one automated processing actions-sequence based at least in part on:
  the actions-sequence identifier, and
  at least one registered actions-sequence;
generating, by the at least one processor, a first device-specific actions-sequence token for authenticating permissions for an actions-sequence session;
  wherein the first device-specific actions-sequence token is based on the workflow request message;
communicating, by the at least one processor to at least one authorization service, a workflow authorization request comprising the first device-specific actions-sequence token;
receiving, by the at least one processor from the at least one authorization service, a workflow execution authorization in response to the workflow authorization request;
  wherein the workflow execution authorization comprises:
    a verification that the first device-specific actions-sequence token matches a second device-specific actions-sequence token, and
    user data of the user;
    wherein the second device-specific actions-sequence token is based on an electronic event authentication message between the initiator device associated with the entity and the at least one authorization service;
    wherein the electronic event authentication message comprises:
      the at least one user profile identifier identifying the user profile associated with the user, and
      the at least one entity identifier identifying the entity;
executing, by the at least one processor, within the actions-sequence session, an instance of the at least one automated processing actions-sequence based at least in part on:
  the workflow execution authorization,
  the actions-sequence identifier, and
  the user data of the user;
  wherein the user data user data of the user confidentially stored separate from the entity;
generating, by the at least one processor, at least one criterion update in response to the executing the instance of the automated processing actions-sequence; and
transmitting, by the at least one processor, a criterion notification to the initiator device, a computing device associated with the user, or both;
  wherein the criterion notification comprises an indication of the at least one criterion update.

2. The method of claim 1, further comprising electronically communicating, by the at least one processor, the criterion notification to contact information identified in the user data, wherein the contact information identifies a communication address of the computing device.

3. The method of claim 2, wherein the contact information comprises a telephone number specified in a user account at a financial institution and the criterion notification comprises a text message to the telephone number.

4. The method of claim 1, wherein the first device-specific actions-sequence token is a one-time token that expires upon generating the at least one criterion update.

5. The method of claim 1, further comprising receiving, by the at least one processor, the electronic event authentication message via a payment advice and authorization message standard.

6. The method of claim 5, further comprising receiving, by the at least one processor, the workflow request message via an application programming interface (API) over an Internet.

7. The method of claim 1, wherein the initiator device comprises a point-of-sale device.

8. The method of claim 7, wherein the point-of-sale device comprises a payment system associated with a merchant.

9. The method of claim 1, further comprising receiving, by the at least one processor, a transaction fulfillment message as the at least one electronic message from a merchant associated with the initiator device, wherein the transaction fulfillment message indicates a fulfillment of a condition of a transaction associated with the workflow request message.

10. The method of claim 1, wherein the criterion notification comprises a purchased item shipping confirmation.

11. A system comprising:
at least one processor configured to execute software instruction causing the at least one processor to perform steps to:
  receive a workflow request message from an initiator device associated with an entity, wherein the workflow request message is associated with a workflow request;
    wherein the workflow request message comprises:
      at least one user profile identifier identifying the user profile associated with the user,
      at least one entity identifier identifying the entity and
      an actions-sequence identifier identifying the at least one automated processing actions-sequence, comprising a plurality of instructions corresponding to a plurality of actions;
determine the at least one automated processing actions-sequence based at least in part on:
the actions-sequence identifier and
at least one registered actions-sequence;
generate a first device-specific actions-sequence token for authenticating permissions for an actions-sequence session;
wherein the first device-specific actions-sequence token is based on the workflow request message;
communicate, to at least one authorization service, a workflow authorization request comprising the first device-specific actions-sequence token;
receive, from the at least one authorization service, a workflow execution authorization in response to the workflow authorization request;
wherein the workflow execution authorization comprises:
a verification that the first device-specific actions-sequence token matches a second device-specific actions-sequence token, and
user data of the user;
wherein the second device-specific actions-sequence token is based on an electronic event authentication message between the initiator device associated with the entity and the at least one authorization service;
wherein the electronic event authentication message comprises:
the at least one user profile identifier identifying the user profile associated with the user, and
the at least one entity identifier identifying the entity;
execute within the actions-sequence session, an instance of the at least one automated processing actions-sequence based at least in part on:
the workflow execution authorization;
the actions-sequence identifier, and
the user data of the user;
wherein the user data of the user confidentially stored separate from the entity;
generate at least one criterion update in response to the executing the instance of the automated processing actions-sequence; and
transmit a criterion notification to the initiator device, a computing device associated with the user, or both;
wherein the criterion notification comprises an indication of the at least one criterion update.

12. The system of claim 11, wherein the software instruction further causes the at least one processor to perform steps to electronically communicate the criterion notification to contact information identified in the user data, wherein the contact information identifies a communication address of the computing device.

13. The system of claim 12, wherein the contact information comprises a telephone number specified in a user account at a financial institution and the criterion notification comprises a text message to the telephone number.

14. The system of claim 11, wherein the first device-specific actions-sequence token is a one-time token that expires upon generating the at least one criterion update.

15. The system of claim 11, wherein the software instruction further causes the at least one processor to perform steps to receive the electronic event authentication message via a payment advice and authorization message standard.

16. The system of claim 15, wherein the software instruction further causes the at least one processor to perform steps to receive the workflow request message via an application programming interface (API) over an Internet.

17. The system of claim 11, wherein the initiator device comprises a point-of-sale device; and wherein the criterion notification comprises a purchased item shipping confirmation.

18. The system of claim 17, wherein the point-of-sale device comprises a payment system associated with a merchant.

19. The system of claim 11, wherein the software instruction further causes the at least one processor to perform steps to receive a transaction fulfillment message as the at least one electronic message from a merchant associated with the initiator device, wherein the transaction fulfillment message indicates a fulfillment of a condition of a transaction associated with the workflow request message.

20. A method comprising:
receiving, by at least one processor, a workflow request message from an initiator device associated with an entity;
wherein the workflow request message comprises:
at least one user profile identifier identifying a user profile of a user associated with the workflow request message,
at least one entity identifier identifying an entity associated with the initiator device, and
an actions-sequence identifier identifying a workflow comprising at least one automated processing actions-sequence;
generating, by the at least one processor, a first device-specific actions-sequence token based on the workflow request message;
receiving, by the at least one processor from at least one separate computer platform, a second device-specific actions-sequence token associated with electronic event authentication message;
executing, by the at least one processor, an instance of the at least one automated processing actions-sequence based at least in part on:
the first device-specific actions-sequence token matching the second device-specific actions-sequence token,
the actions-sequence identifier, and
user data of the user;
generating, by the at least one processor, at least one message based on an output of the instance of the automated processing actions-sequence; and
transmitting, by the at least one processor, the at least one message to the initiator device, a computing device associated with the user, or both.

* * * * *